US006898469B2

(12) United States Patent
Bickford

(10) Patent No.: US 6,898,469 B2
(45) Date of Patent: May 24, 2005

(54) SURVEILLANCE SYSTEM AND METHOD HAVING PARAMETER ESTIMATION AND OPERATING MODE PARTITIONING

(75) Inventor: Randall L. Bickford, Orangevale, CA (US)

(73) Assignee: Intellectual Assets LLC, Lake Tahoe, NV (US)

( * ) Notice: Subject to any disclaimer, the term of this patent is extended or adjusted under 35 U.S.C. 154(b) by 119 days.

(21) Appl. No.: 10/600,224

(22) Filed: Jun. 20, 2003

(65) Prior Publication Data

US 2004/0006398 A1 Jan. 8, 2004

Related U.S. Application Data

(63) Continuation of application No. 09/591,140, filed on Jun. 9, 2000, now Pat. No. 6,609,036.

(51) Int. Cl.[7] .............................................. G05B 13/02
(52) U.S. Cl. ............................. 700/30; 700/28; 700/31; 700/40; 700/46; 700/47; 700/48; 706/14; 706/15; 706/16; 701/2; 701/3; 701/11; 701/23
(58) Field of Search .............................. 700/28, 29, 30, 700/31, 32, 40–49, 50, 51; 701/1–4, 11, 14, 23; 706/14–17

(56) References Cited

U.S. PATENT DOCUMENTS

| 4,295,128 A | 10/1981 | Hashemian et al. |
| 4,478,783 A | 10/1984 | Broadwater |
| 4,761,748 A | 8/1988 | Le Rat et al. |
| 4,937,763 A | 6/1990 | Mott |
| 4,975,968 A | 12/1990 | Yukl |
| 5,009,833 A | 4/1991 | Takeuchi et al. |
| 5,223,207 A | 6/1993 | Gross et al. |
| 5,274,572 A | 12/1993 | O'Neil et al. |
| 5,381,140 A | 1/1995 | Kuroda et al. |

(Continued)

OTHER PUBLICATIONS

Bickford, R.L., Phase Partioning the Multivariate State Estimation Technique (MSET) Process for Improved Paramenter Estimation Performance and Processing Speed, New Technology Report, Jan. 13, 2000, Printed in USA by Expert Microsystems, Inc.

Herzog, J.P., System Classification Using A Learning Vector Quantization (LVQ) Neural Network New Technology Report, Jan. 13, 2000, Printed in USA by Argonne National Laboratory.

Herzog, J.P., et al, MSET Modeling of Crystal River–3 Venturi Flow Meters, 6th International Conference on Nuclear Engineering, 1998, Printed in USA by ASME.

Herzog, J.P., et al. Dynamics Sensor Validation For Reusable Launch Vehicle Propulsion, 34th AIAA/ASME/SAE/ ASEE Joint Propulsion Conference, 1998, Printed in USA by Argonne National Laboratory & Expert Microsystems.

(Continued)

*Primary Examiner*—Ramesh Patel
(74) *Attorney, Agent, or Firm*—Dennis A. DeBoo

(57) ABSTRACT

A system and method for monitoring an apparatus or process asset including creating a process model comprised of a plurality of process submodels each correlative to at least one training data subset partitioned from an unpartitioned training data set and each having an operating mode associated thereto; acquiring a set of observed signal data values from the asset; determining an operating mode of the asset for the set of observed signal data values; selecting a process submodel from the process model as a function of the determined operating mode of the asset; calculating a set of estimated signal data values from the selected process submodel for the determined operating mode; and determining asset status as a function of the calculated set of estimated signal data values for providing asset surveillance and/or control.

88 Claims, 23 Drawing Sheets

U.S. PATENT DOCUMENTS

| | | | |
|---|---|---|---|
| 5,392,320 A | | 2/1995 | Chao |
| 5,402,521 A | | 3/1995 | Niida et al. |
| 5,410,492 A | | 4/1995 | Gross et al. |
| 5,459,675 A | | 10/1995 | Gross et al. |
| 5,465,321 A | | 11/1995 | Smyth |
| 5,506,794 A | | 4/1996 | Lange |
| 5,586,066 A | | 12/1996 | White et al. |
| 5,602,886 A | | 2/1997 | Gross et al. |
| 5,629,872 A | | 5/1997 | Gross et al. |
| 5,661,735 A | | 8/1997 | Fischer |
| 5,680,409 A | | 10/1997 | Qin et al. |
| 5,706,321 A | | 1/1998 | Chen et al. |
| 5,740,033 A | | 4/1998 | Wassick et al. |
| 5,745,382 A | | 4/1998 | Vilim et al. |
| 5,761,090 A | * | 6/1998 | Gross et al. ................ 714/26 |
| 5,764,509 A | | 6/1998 | Gross et al. |
| 5,774,379 A | | 6/1998 | Gross et al. |
| 5,774,569 A | | 6/1998 | Waldenmaier |
| 5,864,773 A | | 1/1999 | Barna et al. |
| 5,877,999 A | * | 3/1999 | Holt et al. ................ 367/131 |
| 5,950,147 A | | 9/1999 | Sarangapani et al. |
| 5,987,399 A | | 11/1999 | Wegerich et al. |
| 5,991,525 A | * | 11/1999 | Shah et al. ................... 703/2 |
| 6,016,465 A | * | 1/2000 | Kelly ....................... 702/116 |
| 6,073,262 A | | 6/2000 | Larkin et al. |
| 6,202,038 B1 | * | 3/2001 | Wegerich et al. .......... 702/183 |
| 6,246,972 B1 | * | 6/2001 | Klimasauskas ............. 703/2 |
| 6,421,667 B1 | * | 7/2002 | Codd et al. .................. 707/4 |
| 6,442,663 B1 | * | 8/2002 | Sun et al. .................. 711/202 |

OTHER PUBLICATIONS

Gross, K.C., et al, Application of a Model–based Fault Detection System to Nuclear Plant Signals, International Conference on Intelligent System Application To Power Systems, Jul. 1997,Printed in USA by Argonne National Laboratory & Florida Power Corporation.

Singer, R.M., et al, Model–Based Nuclear Power Plant Monitoring And Fault Detection: Theoretical Foundations, International Conference On Intelligent Systems, Jul. 1997, Printed in USA by Argonne National Laboratory.

Hylko, J.M., New AI Technique Detects Instruments, Power, Nov. 1998, Printed in USA by Power.

Deyst, J.J., Sensor Validation: Method To Enhance The Quality Of The Man/Machine Interface In Nuclear Power Stations, IEEE Transactions On Nuclear Science, Feb. 1981, Printed in USA by IEEE Transactions On Nuclear Science.

Gross, K.C., et al, Sequential Probability Ratio Test For Nuclear Plant Component Surveillance. Nuclear Technology, 1990, Printed in USA by Argonne National Laboratory.

Racz, A., Comments On The Sequential Probability Ratio Testing Methods, Ann. Nuclear Energy, 1995, Printed in USA by KFKI–Atomic Energy Research Institute Applied Reactor Physics Laboratory.

Kulacsy, K., Further Comments On The Sequential Probability Ratio Testing Methods, Annals Of Nuclear Energy, 1996, Printed in USA by KFKI Atomic Energy Research Institute.

Bickford, R.L., et al, Real–Time Space Shuttle Main Engine Sensor Validation, National Aeronautics and Space Administration, Aug. 1995, Printed in USA by ExperTech & Intelligent Software Associates, Inc.

Bickford, R.L., et al, Real–Time Flight Data Validation For Rocket Engines, AIAA, 1996, Printed in USA by ExperTech & NYMA, Inc.

Bickford, R.L., et al, Real–Time Sensor Validation for Autonomous Flight Control, AIAA, Jul. 1997, Printed in USA by Expert Microsystems, Inc. & Intelligent Software Associates, Inc. & Beoing Defense and Space Group.

Bickford, R.L., et al, Real–Time Sensor Validation For Propulsion Systems, American Institute of Aeronautics and Astronautics, 1998, Printed in USA by Expert Microsystems, Inc & Dynacs Engineering Co.

Bickford, R.L., et al, Real–Time Sensor Data Validation For Space Shuttle Main Engine Telemetry Monitoring, AIAA, Jun. 1999, Printed in USA by Expert Microsystems, Inc.& Intelligent Software Associates, Inc. & Dynacs Engineering Company & NASA Glenn Research Center.

Mott, J.E., et al, EBR–II System Surveillance Using Pattern Recognition Software, ANS/ENS Mtg. on Operability of Nuclear Power Systems, Sep. 1986, Printed in USA by Saratoga Engineering Consultants and Argonne National Laboratory.

Mott, J.E., et al, A Generalized System State Analyzer for Plant Surveillance, ANS/ENS Mtg. on Artificial Intelligence Applications in the Nuclear Industry, Aug. 1987, Printed in USA by EI International, Inc. and Argonne National Laboratory.

Mott, J.E., et al, Pattern–Recognition Software for Plant Surveillance, ANS Transactions, 1987, Printed in USA by the American Nuclear Society.

Mott, J.E., et al, Pattern–Recognition Software for Plant Surveillance, ANS Intl. Mtg. on Nuclear Power Plant Operation, Aug. 1987, Printed in USA by EI International, Inc. and Argonne National Laboratory.

Mott, J.E., et al, Pattern–Recognition Software Detecting the Onset of Failures In Complex Systems, 42nd Mtg. of Mech. Failures Prevention Group, Sep. 1987, Printed in USA by EI International, Inc. and Argonne National Laboratory.

King, R.W., et al, Pattern–Recognition System Application to EBR–II Plant–Life Extension, ANS Mtg. on Nuclear Power Plant Life Extension, Jul. 1988, Printed in USA by Argonne National Laboratory and EI International, Inc.

Singer, R.M., et al, Use of a Pattern Recognition Scheme to Compensate for Critical Sensor Failures, 1st Intl. Machinery Monitoring and Diagnostic Conf., Sep. 1989, Printed in USA by Argonne National Laboratory.

Mott, J.E., et al, A Universal, Fault Tolerant, Non–Linear Analytic Network for Modeling and Fault Detection, 8th Power Plant Dynamics, Control & Testing Symposium, May 1992, Printed in USA by Advanced Modeling Techniques Corporation and Argonne National Laboratory.

Mott, J.E., et al, Feedwater Flow Estimation via Sample–Based Modeling, 8th Power Plant Dynamics, Control & Testing Symposium, May 1992, Printed in USA by Advanced Modeling Techniques Corporation and Northeast Utilities.

Harris, T.J., et al, Empirical Models for Intelligent Data Validation, 35th POWID Symposium, Jun. 1992, Printed in USA by Halliburton NUS and Entergy Operations, Inc.

Huang, C., et al, Inference in Belief Networks: A Procedural Guide, Intl. Journal of Approximate Reasoning, 11:1–45, 1994, Printed in USA by Elsevier Science, Inc.

Singer, R.M., et al, A Pattern–recognition–based, Fault–tolerant Monitoring and Diagnostic Technique, 7th Symp. on Nuclear Reactor Surveillance, Jun. 1995, Printed in USA by Argonne National Laboratory.

Singer, R.M., et al, Power Plant Surveillance and Fault Detection: Applications to a Commercial PWR, Intl. Atomic Energy Commission, IAEA–TECDOC–1054, pp. 185–200, Sep. 1997, Printed in USA by Argonne National Laboratory.

Miron, A., et al, The Effects of Parameter Variation on MSET Models of the Crystal River–3 Feedwater Flow System, ANS Annual Meeting, Jun. 1998, Printed in USA by Argonne National Laboratory.

Bickford, R.L., et al, Sensor Validation Tools and SSME Network, Final Report, Apr. 2000, Printed in USA by Expert Microsystems, Inc.

Zavaljevski, N., et al, Support Vector Machines for Nuclear Reactor State Estimation, ANS Topical Mtg. on Advances in Reactor Physics, May 2000, Printed in USA by Argonne National Laboratory.

Hansen, E.J., et al, Similarity Based Regression: Applied Advanced Pattern Recognition for Power Plant Analysis, 1994 EPRI Heat Rate improvement Conference. Printed in USA by Performance Consulting Services, Inc.

Griebenow, R.D., et al, Applied Pattern Recognition for Plant Monitoring and Data Validation, 5th International POWID Controls and Instrumentation Conference, Jun. 1995. Printed in USA by Performance Consulting Services, Inc.

* cited by examiner

| LVQ Neural Network Parameter | Design Value |
|---|---|
| Input Signals | MCC_PC_AVG<br>(PC_CNTL_REF – MCC_PC_AVG)<br>($\Delta$PC_CNTL_REF / $\Delta$TIME) |
| Number of Classes | 9 (one for each operating mode defined in Figure 16) |
| Number of Output Nodes per Class ($N_{class}$) | 8 (for each operating mode) |
| Learning Algorithm | LVQ2.1 |
| Maximum Number of Epochs ($n_{eps}$) | 250 |
| Initial Value of the Learning Rate ($\lambda_0$) | 0.02 |
| Window Size ($\epsilon$) | 0.5 |
| Number of Training Vector Pairs ($n_{LVQ}$) | 500 |

Figure 12

| SSME Signal Parameter ID | SSME Signal Parameter Name |
|---|---|
| PID40 | OPOV_ACT_POS_A |
| PID42 | FPOV_ACT_POS_A |
| PID52 | HPFP_DS_P_A |
| PID58 | FPB_PC_A |
| PID63 | MCC_PC_AVG |
| PID90 | HPOP_DS_P |
| PID100 | FUEL_FLOW_AVG |
| PID105 | HPFT_DS_T_A2 |
| PID106 | HPFT_DS_T_A3 |
| PID107 | HPFT_DS_T_B2 |
| PID108 | HPFT_DS_T_B3 |
| PID200 | MCC_PC_A_AVG |
| PID201 | MCC_PC_B_AVG |
| PID205 | HPOT_DS_T_A2 |
| PID206 | HPOT_DS_T_A3 |
| PID207 | HPOT_DS_T_B2 |
| PID208 | HPOT_DS_T_B3 |

Figure 13

| Space Shuttle Flight ID | Engine Position |
|---|---|
| STS077 | E2 |
| STS078 | E1 |
| STS081 | E3 |
| STS082 | E1 |
| STS085 | E1 |
| STS085 | E2 |
| STS086 | E2 |
| STS087 | E2 |
| STS087 | E3 |
| STS090 | E1 |

Figure 14

| Model Description | Number of Signals | Modeled Operating Modes | Number of Process Mem Vectors | Parameter Estimation Method | Fault Detection Method |
|---|---|---|---|---|---|
| LVQ mode-partitioned (Model PD) | 17 (defined in Figure 13) | Start01<br>Start12<br>Start24<br>SteadyFull<br>SteadyLow<br>Upthrust<br>Downthrust | 150<br>150<br>150<br>150<br>150<br>150<br>150 | MSET / SSA | SPRT mean pos & neg |
| All-modes (Model A150) | 17 (same) | All | 150 | MSET / SSA | SPRT mean pos & neg |
| All-modes (Model A300) | 17 (same) | All | 300 | MSET / SSA | SPRT mean pos & neg |

Figure 15

| Mode Name | Operating Mode Criteria |
|---|---|
| PREFIRE | All observations preceding the vehicle start command to the engine. Considered a non-operating mode. |
| START01 | Controller cycles 0 through 24 after receipt of the engine start command. |
| START12 | Controller cycles 25 through 49 after receipt of the engine start command. |
| START24 | Controller cycle 50 through detection of steady-state operation (typically at controller cycle ~110). The rule for transition to STEADY_FULL is: If in START24 and if $\|PC\_CNTL\_REF - MCC\_PC\_AVG\| <= (5 * 3.35)$, and $PC\_CNTL\_REF >= 2500$ transition to STEADY_FULL |
| STEADY_FULL | STEADY_FULL is declared when either: 1) the last cycle's state was STEADY_FULL and the commanded PC is both unchanged and greater than 2500 psi, e.g., $\| PC\_CNTL\_REF - LAST\_PC\_CNTL\_REF \| < 3.35$ and $PC\_CNTL\_REF >= 2500$; or 2) when the last cycle's state was a transient state and $\| PC\_CNTL\_REF - MCC\_PC\_AVG \| <= (5 * 3.35)$ and $PC\_CNTL\_REF >= 2500$. |
| STEADY_LOW | STEADY_LOW is declared when either: 1) the last cycle's state was STEADY_LOW and the commanded PC is both unchanged and less than 2500 psi, e.g., $\| PC\_CNTL\_REF - LAST\_PC\_CNTL\_REF \| < 3.35$ and $PC\_CNTL\_REF < 2500$; or 2) when the last cycle's state was a transient state and $\| PC\_CNTL\_REF - MCC\_PC\_AVG \| <= (5 * 3.35)$ and $PC\_CNTL\_REF < 2500$. |
| UPTHRUST | UPTHRUST is declared when 1) the commanded PC has increased since the last cycle, and 2) $\| PC\_CNTL\_REF - MCC\_PC\_AVG \| > (5 * 3.35)$ |
| DOWNTHRUST | DOWNTHRUST is declared when 1) the commanded PC has decreased since the last cycle, and 2) $\| PC\_CNTL\_REF - MCC\_PC\_AVG \| > (5 * 3.35)$ |
| SHUTDOWN | All observations following the vehicle shutdown command to the engine. Considered a non-operating mode. |

Figure 16

| Test No. | Test Description | Sensor Failures | One Cycle Alarms | Total Avg Error % | Avg Cycle Time |
|---|---|---|---|---|---|
| PD-01 | STS077E1. Nominal flight data. | 0 | 2 | 0.408% | 4.88 msec |
| PD-02 | STS077E2. Nominal flight data. | 0 | 0 | 0.217% | 4.90 msec |
| PD-03 | STS078E1. Nominal flight data. | 0 | 0 | 0.352% | 4.98 msec |
| PD-04 | STS078E2. Nominal flight data. | 0 | 1 | 0.296% | 4.94 msec |
| PD-05 | STS081E1. Nominal flight data. | 0 | 2 | 0.400% | 5.01 msec |
| PD-06 | STS081E3. Nominal flight data. | 0 | 0 | 0.281% | 5.07 msec |
| PD-07 | STS082E2. Nominal flight data. | 0 | 1 | 0.286% | 4.96 msec |
| PD-08 | STS085E3. Nominal flight data. | 0 | 0 | 0.282% | 4.98 msec |
| PD-09 | STS086E2. Nominal flight data. | 0 | 0 | 0.254% | 5.02 msec |
| PD-10 | STS087E2. Nominal flight data. | 0 | 0 | 0.246% | 5.02 msec |
| | *Average for All Tests* | *0* | *1* | *0.302%* | *4.98 msec* |

Figure 17

| Test No. | Test Description | Sensor Failures | One Cycle Alarms | Time to Detect | Error at Detect |
|---|---|---|---|---|---|
| PD-11 | Drift PID40. 0.14 pct/sec beginning at 10.0 sec. | 1 (PID40) | 5 | 28.88 sec | 5.8% |
| PD-12 | Noise PID40. ±5 pct random beginning at 10.0 sec. | 1 (PID40) | 38 | 10.76 sec | N/A |
| PD-13 | Drift PID42. 0.16 pct/sec beginning at 10.0 sec. | 1 (PID42) | 9 | 29.32 sec | 5.9% |
| PD-14 | Noise PID42. ±5 pct random beginning at 10.0 sec. | 1 (PID42) | 66 | 42.04 sec | N/A |
| PD-15 | Drift PID52. 11.9 psi/sec beginning at 10.0 sec. | 1 (PID52) | 4 | 12.24 sec | 2.4% |
| PD-16 | Drift PID58. 10.2 psi/sec beginning at 10.0 sec. | 1 (PID58) | 5 | 9.44 sec | 1.9% |
| PD-17 | Drift PID90. 8.2 psi/sec beginning at 10.0 sec. | 1 (PID90) | 9 | 8.12 sec | 1.6% |
| PD-18 | Drift PID100. 31.9 gpm/sec beginning at 10.0 sec. | 1 (PID100) | 5 | 12.12 sec | 2.4% |
| PD-19 | Drift PID105. 3.4 degR/sec beginning at 10.0 sec. | 1 (PID105) | 11 | 16.16 sec | 3.2% |
| PD-20 | Drift PID200. 6.3 psi/sec beginning at 10.0 sec. | 1 (PID200) | 4 | 3.40 sec | 0.7% |
| PD-21 | Drift PID205. 2.7 degR/sec beginning at 10.0 sec. | 1 (PID205) | 4 | 18.28 sec | 3.7% |
| | Average for All Drift Tests | | | 15.3 sec | 3.1% |

Figure 18

| Test No. | Test D scription | S nsor Failures | On Cycle Alarms | Total Avg Error % | Avg Cycl Time |
|---|---|---|---|---|---|
| A150-01 | STS077E1. Nominal flight data. | 0 | 0 | 0.556% | 5.27 msec |
| A150-02 | STS077E2. Nominal flight data. | 0 | 9 | 0.458% | 5.28 msec |
| A150-03 | STS078E1. Nominal flight data. | 0 | 0 | 0.593% | 4.90 msec |
| A150-04 | STS078E2. Nominal flight data. | 0 | 0 | 0.396% | 5.28 msec |
| A150-05 | STS081E1. Nominal flight data. | 0 | 0 | 0.685% | 4.67 msec |
| A150-06 | STS081E3. Nominal flight data. | 0 | 0 | 0.480% | 4.77 msec |
| A150-07 | STS082E2. Nominal flight data. | 1 (PID58) False Alarm | 13 | 0.720% | 5.28 msec |
| A150-08 | STS085E3. Nominal flight data. | 0 | 0 | 0.519% | 4.73 msec |
| A150-09 | STS086E2. Nominal flight data. | 0 | 0 | 0.410% | 4.77 msec |
| A150-10 | STS087E2. Nominal flight data. | 0 | 0 | 0.399% | 5.22 msec |
| | *Average for All Tests* | *0* | *2* | *0.522%* | *5.02 msec* |

Figure 19. Comparative Results

| Test No. | Test Description | Sensor Failures | One Cycle Alarms | Time to Detect | Error at Detect |
|---|---|---|---|---|---|
| A150-11 | Drift PID40. 0.14 pct/sec beginning at 10.0 sec. | 1 (PID40) | 19 | 125.68 sec | 25.1% |
| A150-12 | Noise PID40. ±5 pct random beginning at 10.0 sec. | 1 (PID40) | 12 | 95.04 sec | N/A |
| A150-13 | Drift PID42. 0.16 pct/sec beginning at 10.0 sec. | 1 (PID42) | 12 | 154.92 sec | 31.0% |
| A150-14 | Noise PID42. ±5 pct random beginning at 10.0 sec. | 0 (Missed Alarm) | 0 | Missed Alarm | N/A |
| A150-15 | Drift PID52. 11.9 psi/sec beginning at 10.0 sec. | 1 (PID52) | 4 | 27.40 sec | 5.5% |
| A150-16 | Drift PID58. 10.2 psi/sec beginning at 10.0 sec. | 1 (PID58) | 6 | 18.92 sec | 3.8% |
| A150-17 | Drift PID90. 8.2 psi/sec beginning at 10.0 sec. | 1 (PID90) | 4 | 60.32 sec | 12.1% |
| A150-18 | Drift PID100. 31.9 gpm/sec beginning at 10.0 sec. | 2 (PID100) & (PID58 False Alarm) | 23 | 43.24 sec | 8.6% |
| A150-19 | Drift PID105. 3.4 degR/sec beginning at 10.0 sec. | 1 (PID105) | 10 | 46.20 sec | 9.2% |
| A150-20 | Drift PID200. 6.3 psi/sec beginning at 10.0 sec. | 1 (PID200) | 4 | 22.72 sec | 4.5% |
| A150-21 | Drift PID205. 2.7 degR/sec beginning at 10.0 sec. | 1 (PID205) | 8 | 89.04 sec | 17.8% |
| *Average for All Drift Tests* | | | | 65.4 sec | 13.1% |

Figure 20. Comparative Results

| Test No. | Test Description | Sensor Failures | One Cycle Alarms | Total Avg Error % | Avg Cycle Time |
|---|---|---|---|---|---|
| A300-01 | STS077E1. Nominal flight data. | 0 | 0 | 0.488% | 17.84 msec |
| A300-02 | STS077E2. Nominal flight data. | 0 | 0 | 0.379% | 17.75 msec |
| A300-03 | STS078E1. Nominal flight data. | 0 | 0 | 0.424% | 19.40 msec |
| A300-04 | STS078E2. Nominal flight data. | 0 | 0 | 0.359% | 19.02 msec |
| A300-05 | STS081E1. Nominal flight data. | 0 | 0 | 0.633% | 17.69 msec |
| A300-06 | STS081E3. Nominal flight data. | 0 | 0 | 0.501% | 17.80 msec |
| A300-07 | STS082E2. Nominal flight data. | 0 | 0 | 0.620% | 19.01 msec |
| A300-08 | STS085E3. Nominal flight data. | 0 | 2 | 0.521% | 17.73 msec |
| A300-09 | STS086E2. Nominal flight data. | 0 | 1 | 0.340% | 17.78 msec |
| A300-10 | STS087E2. Nominal flight data. | 0 | 0 | 0.319% | 18.10 msec |
| | Average for All Tests | 0 | 0 | 0.458% | 18.21 msec |

Figure 21. Comparative Results

| Test No. | Test Description | Sensor Failures | One Cycle Alarms[1] | Time to Detect | Error at Detect |
|---|---|---|---|---|---|
| A300-11 | Drift PID40. 0.14 pct/sec beginning at 10.0 sec. | 1 (PID40) | 39 | 138.80 sec | 27.8% |
| A300-12 | Noise PID40. ±5 pct random beginning at 10.0 sec. | 0 (Missed Alarm) | 2 | Missed Alarm | N/A |
| A300-13 | Drift PID42. 0.16 pct/sec beginning at 10.0 sec. | 1 (PID42) | 26 | 139.08 sec | 27.8% |
| A300-14 | Noise PID42. ±5 pct random beginning at 10.0 sec. | 0 (Missed Alarm) | 2 | Missed Alarm | N/A |
| A300-15 | Drift PID52. 11.9 psi/sec beginning at 10.0 sec. | 1 (PID52) | 9 | 26.04 sec | 5.2% |
| A300-16 | Drift PID58. 10.2 psi/sec beginning at 10.0 sec. | 1 (PID58) | 8 | 16.92 sec | 3.4% |
| A300-17 | Drift PID90. 8.2 psi/sec beginning at 10.0 sec. | 1 (PID90) | 6 | 58.12 sec | 11.6% |
| A300-18 | Drift PID100. 31.9 gpm/sec beginning at 10.0 sec. | 1 (PID100) | 9 | 23.36 sec | 4.7% |
| A300-19 | Drift PID105. 3.4 degR/sec beginning at 10.0 sec. | 1 (PID105) | 6 | 28.32 sec | 5.7% |
| A300-20 | Drift PID200. 6.3 psi/sec beginning at 10.0 sec. | 1 (PID200) | 6 | 18.52 sec | 3.7% |
| A300-21 | Drift PID205. 2.7 degR/sec beginning at 10.0 sec. | 1 (PID205) | 12 | 64.32 sec | 12.9% |
| | Average for All Drift Tests | | | 57.1 sec | 11.4% |

Figure 22. Comparative Results

SURVEILLANCE SYSTEM AND METHOD HAVING PARAMETER ESTIMATION AND OPERATING MODE PARTITIONING

CROSS-REFERENCE TO RELATED APPLICATIONS

This application is a continuation patent application of U.S. application Ser. No. 09/591,140, filed Jun. 9, 2000, now U.S. Pat. No. 6,609,036.

STATEMENT REGARDING FEDERALLY SPONSORED RESEARCH OR DEVELOPMENT

The invention described herein was made in the performance of work under NASA Small Business Innovation Research (SBIR) Contract NAS4-99012, and is subject to the provisions of Public Law 96-517 (35 USC 202) and the Code of Federal Regulations 48 CFR 52.227-11 as modified by 48 CFR 1852.227-11, in which the contractor has elected to retain title.

FIELD OF THE INVENTION

The instant invention relates generally to a system and method for process parameter estimation using operating mode partitioning and, in particular, to a system and method for performing high sensitivity surveillance of an asset such as a process and/or apparatus preferably having at least two distinct modes of operation wherein surveillance is performed using an operating mode partitioned parameter estimation model of the asset.

BACKGROUND OF THE INVENTION

Conventional process surveillance schemes are sensitive only to gross changes in the mean value of a process signal or to large steps or spikes that exceed some threshold limit value. These conventional methods suffer from either a large number of false alarms (if thresholds are set too close to normal operating levels) or from a large number of missed (or delayed) alarms (if the thresholds are set too expansively). Moreover, most conventional methods cannot perceive the onset of a process disturbance or sensor signal error that gives rise to a signal below the threshold level or an alarm condition. Most conventional methods also do not account for the relationship between a measurement by one sensor relative to another sensor.

Recently, improved methods for process surveillance have developed from the application of certain aspects of artificial intelligence technology. Specifically, parameter estimation methods have been developed using either statistical, mathematical or neural network techniques to learn a model of the normal patterns present in a system of process signals. After learning these patterns, the learned model is used as a parameter estimator to create one or more virtual signals given a new observation of the actual process signals. Further, high sensitivity surveillance methods have been developed for detecting process and signal faults by analysis of a mathematical comparison between the actual process signal and its virtual signal counterpart.

Parameter estimation based surveillance schemes have been shown to provide improved surveillance relative to conventional schemes for a wide variety of assets including industrial, utility, business, medical, transportation, financial, and biological systems. However, parameter estimation based surveillance schemes have in general shown limited success when applied to complex processes. Applicant recognizes and believes that this is because the parameter estimation model for a complex process must characterize the entire operating state space of the process to provide effective surveillance. Moreover, a review of the known prior-art discloses that virtually all such systems developed to date utilize a single model of the process to span the entire set of possible operating modes. Hence, a significant shortcoming of the known prior-art is that, inter alia, statistically derived models become extremely large and neural network models become difficult or impractical to train when the process operating state space is complex. The implication for statistically derived models is that the parameter estimation method and system becomes computationally expensive to operate thereby limiting the utility of the method for on-line or real-time surveillance. An alternative for statistically derived models is to constrain the size of the model; however this constraint limits the accuracy of the parameter estimation method and thereby limits the sensitivity of the surveillance method. The implication for mathematical and neural network models is simply that the parameter estimation method and system becomes less accurate thereby degrading the sensitivity of the surveillance method.

Many attempts to apply multivariate state estimation techniques, mathematical modeling techniques and neural network techniques to assets such as industrial, utility, business, medical, transportation, financial, and biological processes have met with poor results in part because the parameter estimation models used were expected to characterize the entire operating state space of the process. In one example, a multivariate state estimation technique (MSET) based surveillance system for the Space Shuttle Main Engine's telemetry data was found to produce numerous false alarms when the learned MSET parameter estimation model was constrained to a size suitable for on-line, real-time surveillance. In this case, the surveillance system false alarm rate could be reduced by desensitizing the surveillance threshold parameters; however, the missed alarm rates then became too high for practical use in the telemetry data monitoring application.

Moreover, current multivariate state estimation techniques, mathematical modeling techniques and neural network techniques for surveillance of assets such as industrial, utility, business, medical, transportation, financial, and biological processes fail to recognize the surveillance performance limitations that occur when it becomes necessary to trade-off decision processing speed against decision accuracy. This may be attributed, in part, to the relative immaturity of the field of artificial intelligence and computer-assisted surveillance with regard to real-world process control applications. Additionally, a general failure to recognize the specific limitations of trading off decision processing speed against decision accuracy for computer-assisted surveillance is punctuated by an apparent lack of known prior art teachings that address potential methods to overcome this limitation. In general, the known prior-art teaches computer-assisted surveillance solutions that are either applied globally to all operating modes of an asset or applied only to a single predominant operating mode, for example, applied only to steady state operations while neglecting all transient operating states of the asset.

For the foregoing reasons, there is a need for a surveillance system and method that overcomes the significant shortcoming of the known prior-art as delineated hereinabove.

BRIEF SUMMARY OF THE INVENTION

The instant invention is distinguished over the known prior art in a multiplicity of ways. For one thing, one embodiment of the invention provides a surveillance system and method that partitions parameter estimation models of an asset for overcoming a performance limiting trade-off between decision processing speed and decision accuracy that has been generally unrecognized by the known prior-art. Additionally, one embodiment of the invention can employ any one of a plurality of parameter estimation methods and the process models used therewith for improving surveillance performance. Furthermore, one embodiment of the invention provides a surveillance system and method that provides an operating mode partitioned parameter estimation model that can be accomplished by observation and analysis of a time sequence of process signal data and by a combination of a plurality of techniques.

Moreover, one embodiment of the invention provides a surveillance system and method that provides an operating mode partitioning of the parameter estimation model which enables different parameter estimation methods, thresholds and decision logic to be used for surveillance within each individual operating mode of an asset. This ability enables surveillance to be performed by the instant invention with lower false alarm rates and lower missed alarm rates than can be achieved by the known prior-art methods.

Hence, one embodiment of the invention provides a surveillance system and method that performs its intended function much more effectively by enabling higher decision processing speed without a concomitant reduction in decision accuracy. Conversely, one embodiment of the invention alternately enables improved decision accuracy without a concomitant reduction in decision processing speed. Additionally, these competing criteria may be traded-off to achieve the optimal performance solution for a specific surveillance application.

Furthermore, and in contrast to the known prior art, and in one embodiment of the invention, parameter estimation methods, thresholds and decision logic may be individually tailored for each operating mode of the asset thereby providing additional capability to reduce decision error rates for the surveillance system.

In one embodiment of the invention, the instant invention provides a surveillance system and method that creates and uses, for the purpose of process surveillance, a coordinated array of process parameter estimation submodels wherein each process submodel in the coordinated array is optimized for a single process operating mode or subset of operating modes of an asset.

In another embodiment of the invention, a method for determining asset status includes the steps of creating a process model comprised of a plurality of process submodels each correlative to at least one training data subset partitioned from an unpartitioned training data set and each having an operating mode associated thereto; acquiring a set of observed signal data values from an asset; determining an operating mode of the asset for the set of observed signal data values; selecting a process submodel from the process model as a function of the determined operating mode of the asset; calculating a set of estimated signal data values from the selected process submodel for the determined operating mode, and determining asset status as a function of the calculated set of estimated signal data values.

In another embodiment of the invention, a system for determining asset status is comprised of a training data set partitionable into a plurality of training data subsets having a plurality of predefined operating modes associated therewith such that each partitioned training data subset includes at least one of said predefined operating modes associated thereto; means for acquiring a set of observed signal data values from an asset; means for determining an operating mode of the asset for the set of observed signal data values; means for selecting a process submodel from a process model as a function of said determined operating mode of the asset; means for calculating a set of estimated signal data values from said selected process submodel for said determined operating mode for performing asset surveillance, and means for determining asset status as a function of the calculated set of estimated signal data values.

In another embodiment of the invention, an asset surveillance system is comprised of a data acquisition means for acquiring a set of signals from an asset correlative to asset status; a digitizing means for digitizing said set of signals for defining a set of digitized signals; a process model comprised of a plurality of process submodels each correlative to at least one training data subset partitioned from an unpartitioned training data set and wherein each of said partitioned training data subsets and each of said plurality of process submodels has at least one defined operating mode associated therewith; an operating mode determination means for determining an operating mode of said asset; a process model selection means for selecting at least one of said process submodels as a function of said determined operating mode; a parameter estimation means for producing a set of estimated signal values from said selected process submodel; a fault detection means for detecting the presence of a fault as a function of said set of estimated signal values from said selected process submodel for providing asset surveillance.

In another embodiment of the invention, a method for performing surveillance of an asset includes the steps of creating a process model comprised of a plurality of process submodels each correlative to at least one training data subset partitioned from an unpartitioned training data set and each having an operating mode associated thereto; acquiring a set of observed signal data values from the asset; determining an operating mode of the asset for the set of observed signal data values; selecting a process submodel from the process model as a function of the determined operating mode of the asset; calculating a set of estimated signal data values from the selected process submodel for the determined operating mode, and determining asset status by performing the step of comparing the set of observed signal data values to the calculated set of estimated signal data values for performing asset surveillance.

Moreover, having thus summarized the invention, it should be apparent that numerous modifications and adaptations may be resorted to without departing from the scope and fair meaning of the present invention as set forth hereinbelow by the claims

BRIEF DESCRIPTION OF THE DRAWINGS

FIG. 12 lists the learning vector quantization neural network operating mode classifier design characteristics used for feasibility testing of an embodiment of the invention.

FIG. 13 lists the Space Shuttle Main Engine parameters used for feasibility testing in an embodiment of the invention.

FIG. 14 lists the Space Shuttle Main Engine flight telemetry data sets used for feasibility testing of an embodiment of the invention.

FIG. 15 lists the parameter estimation model and model array configurations used for feasibility testing of an embodiment of the invention.

FIG. 16 lists the Space Shuttle Main Engine operating mode partitioning rules used for feasibility testing of an embodiment of the invention.

FIG. 17 lists the feasibility test results for nominal flight data using an embodiment of an operating mode partitioned MSET process model array for the Space Shuttle Main Engine in an embodiment of the invention.

FIG. 18 lists the feasibility test results for signal drift failure detection simulations using an embodiment of an operating mode partitioned MSET process model array for the Space Shuttle Main Engine in an embodiment of the invention.

FIG. 19 lists the comparative test results for nominal flight data using an unpartitioned MSET model for the Space Shuttle Main Engine containing one hundred fifty observation vectors.

FIG. 20 lists the comparative test results for signal drift failure detection using a unpartitioned MSET model for the Space Shuttle Main Engine containing one hundred fifty observation vectors.

FIG. 21 lists the comparative test results for nominal flight data using a unpartitioned MSET model for the Space Shuttle Main Engine containing three hundred observation vectors.

FIG. 22 lists the comparative test results for signal drift failure detection using a unpartitioned MSET model for the Space Shuttle Main Engine containing three hundred observation vectors.

DETAILED DESCRIPTION OF THE INVENTION

Figure 1:
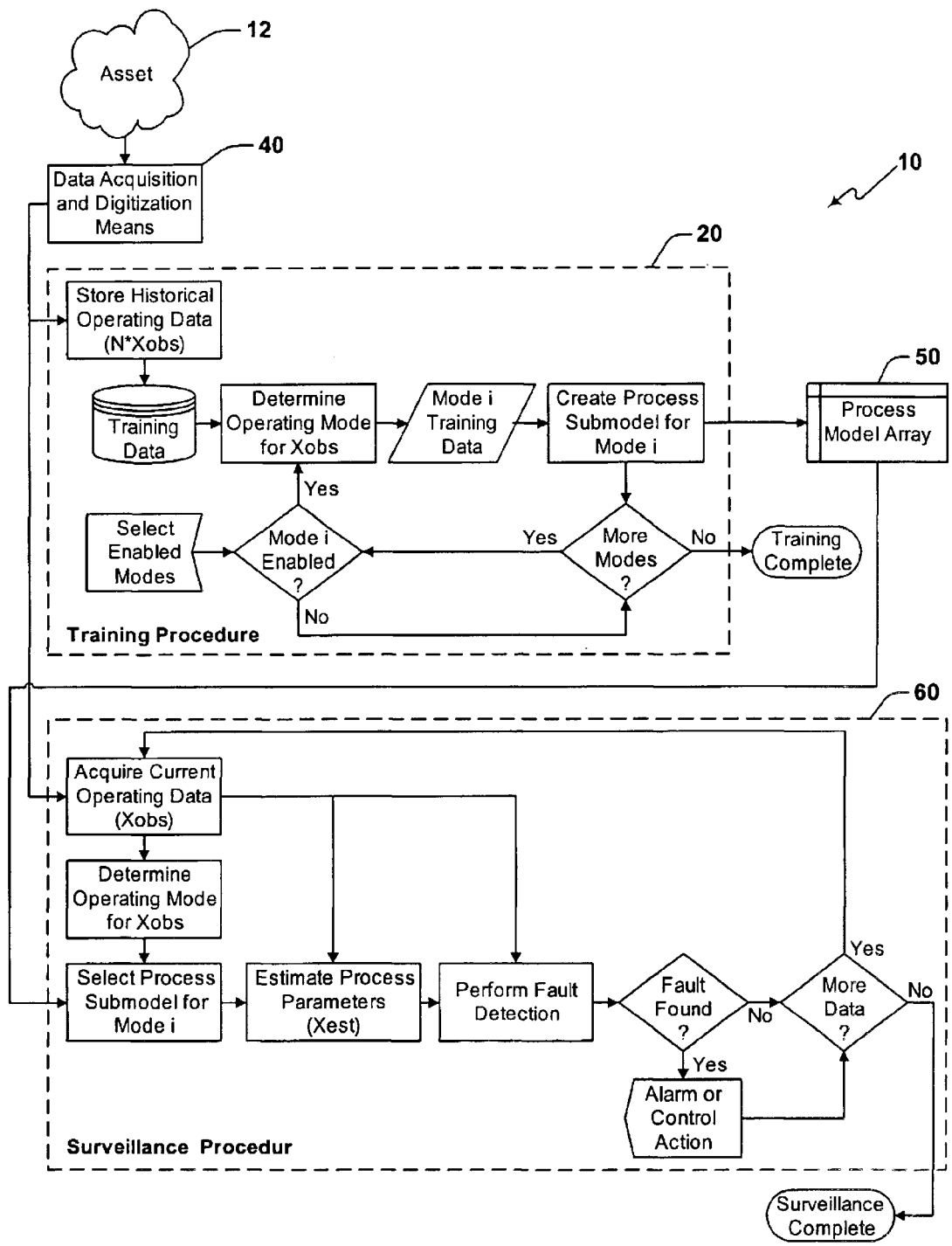
FIG. 1 is a schematic functional flow diagram of an embodiment of the invention.

Considering the drawings, wherein like reference numerals denote like parts throughout the various drawing figures, reference numeral 10 is directed to the system according to the instant invention.

In its essence, and referring to FIG. 1, the system 10 is generally comprised of a method and apparatus for performing high sensitivity surveillance of a wide variety of assets including industrial, utility, business, medical, transportation, financial, and biological processes and apparatuses wherein such process and/or apparatus asset preferably has at least two distinct modes or domains of operation (e.g., transient and steady state modes or domains). The system includes a training procedure 20 wherein a parameter estimation process model array 50 of an asset 12 (e.g., a process and/or apparatus) is learned from historical operating data using at least one of a plurality of computer-assisted techniques. Historical operating data includes a set of observations from normal operation of the asset 12 that is acquired and digitized by a data acquisition means 40 using any combination of electronic data acquisition hardware and signal processing software known to those having ordinary skill in the art, and informed by the present disclosure. Additionally, and as delineated infra, one hallmark of the instant invention is an operating mode partitioning method of a parameter estimation process model array 50 for the asset 12 which is performed during the training procedure 20.

The system 10 further includes a surveillance procedure 60 wherein the operating mode partitioned parameter estimation process model array 50 is used for high sensitivity computer-assisted surveillance of the asset 12 for the purpose of determining whether a process fault or failure necessitates an alarm or control action. Another hallmark of the instant invention, as delineated hereinbelow, is the use of the operating mode partitioned parameter estimation process model array 50 as an element of the surveillance procedure 60. The system 10 described herein is useful for ultra-sensitive detection of the onset of sensor or data signal degradation, component performance degradation, and process operating anomalies.

Figure 2:
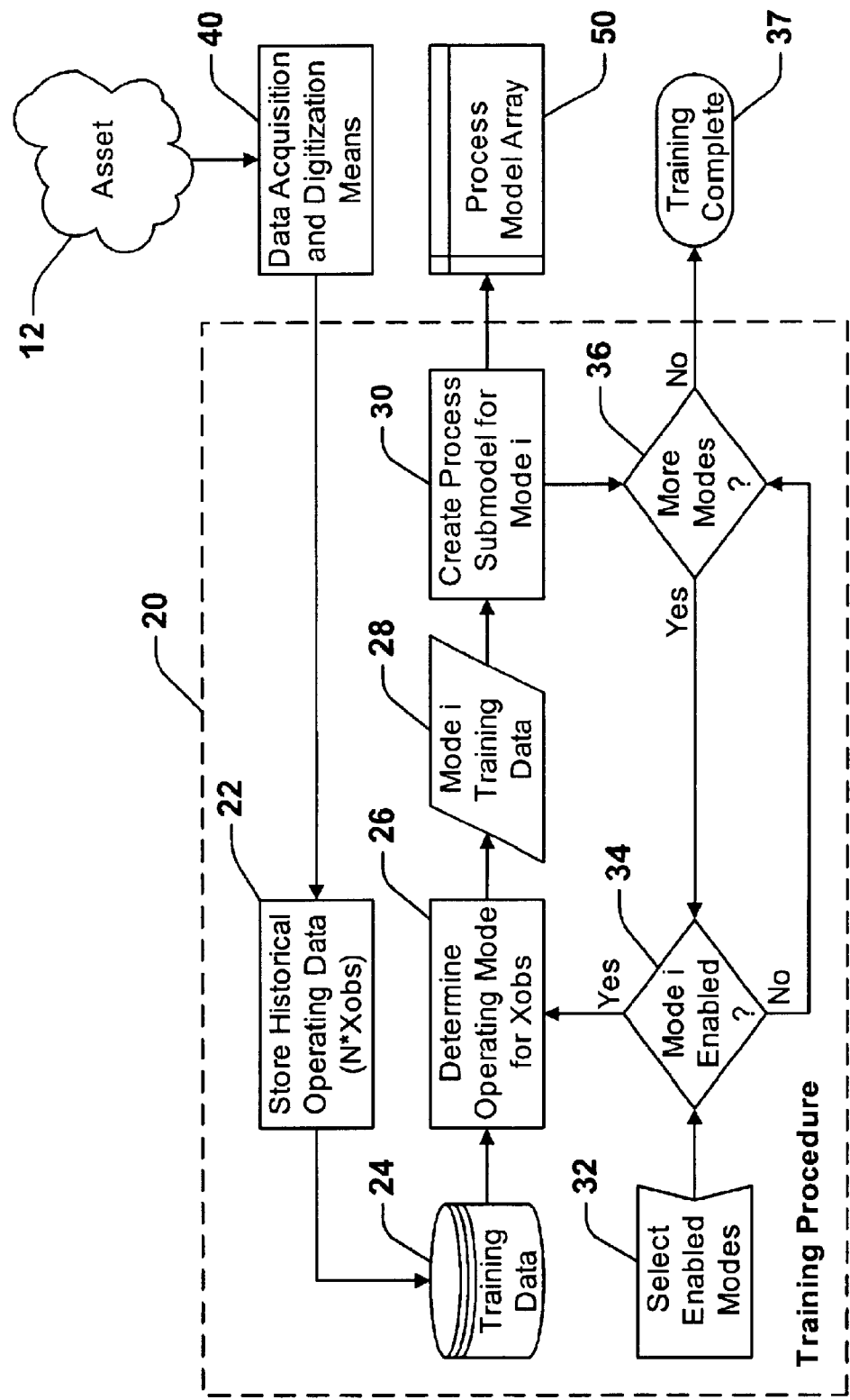
FIG. 2 is a schematic functional flow diagram of a method and system for training an operating mode partitioned array of parameter estimation models using recorded observations of the actual process signals in an embodiment of the invention.

Description of the Training Procedure:

More specifically, and referring to FIG. 2, the training procedure 20 of the system 10 includes a method and apparatus for training or preparing the process model array 50 using historical operating data from the asset 12 that has been acquired by the data acquisition means 40 using any combination of conventional electronic data acquisition hardware and signal processing software as is well known in the art. The historical operating data is acquired in digital format and stored using a data storage procedure 22 to create a training data set 24. The training data set 24 includes at least N discrete observations of the asset 12 wherein each single observation, herein denoted Xobs, is comprised of a vector of data values for each signal parameter to be included in the process model array 50. For the purposes of the training procedure 20, the number of observations, N, acquired is at least great enough to adequately bound the operating state space of the asset 12. Thus, the training data set 24 provides a representative sample of the signals produced by the asset 12 during all normal modes of operation.

Again referring to FIG. 2, upon acquiring the training data set 24 the designer proceeds to implement the unique method for the training procedure 20 in accordance with instant invention. The unique method for the training procedure 20 is comprised of partitioning the training data set 24 into subsets wherein a training data subset 28 is representative of a single operating mode or subset of operating modes of the asset 12. Further, the unique method for the training procedure 20 also includes a process submodel creation procedure 30 for creating at least one process submodel for inclusion in the process model array 50 using at least one training data subset 28. In practice, the designer first selects the operating modes that will be included in the process model array 50 by means of an operating mode enable procedure 32. The method thereafter is comprised of a training loop wherein each possible operating mode of the asset 12 is assessed for inclusion in the process model array 50.

The training loop is in general controlled by two decision procedures. The mode enabled decision procedure 34 determines whether the designer intends a specific operating mode to be included in the process model array 50. If the operating mode is not to be included, no further processing is required and the training loop proceeds to the next possible operating mode as controlled by the more modes decision procedure 36. If the operating mode is to be included, all observations included in the training data set 24 are assessed using the operating mode determination procedure 26 in order to extract the training data subset 28 specific to the currently selected operating mode. Depending on the preference of the designer implementing the training loop, the operating mode determination and training data subset extraction procedures may be, in general, performed as needed or in advance of the training loop. The training loop shown in FIG. 2 illustrates operating mode determination and extraction on an as needed basis but is not intended to constrain the method to preclude determination and extraction in advance of implementing the training loop. The final step in the training loop is a process submodel creation procedure 30. The process submodel creation procedure 30 creates the parameter estimation submodel for the currently selected operating mode and trains the submodel using the training data subset 28 specific to the currently selected operating mode. The process submodel creation procedure 30 further stores this submodel as a new element in the process model array 50.

Still referring to FIG. 2, the operating mode determination procedure 26 used to classify each observation included in the training data set 24 may be, in general, performed using any method suitable for determining the operating mode of the asset 12 given an observation or series of observations therefrom. Methods suitable for the operating mode determination procedure 26 include, but are not limited to, a plurality of mathematical or logic sequence techniques, a plurality of expert system techniques, a plurality of fuzzy logic techniques, and a plurality of neural network techniques.

Continuing to refer to FIG. 2, the process submodel creation procedure 30 may be, in general, performed using any method suitable for defining a parameter estimation model useful for estimating the values of one or more process signals. Methods suitable for the process submodel creation procedure 30 include, but are not limited to, a plurality of multivariate state estimation techniques, a plurality of neural network techniques, a plurality of mathematical model techniques, a plurality of autoregressive moving average techniques, and a plurality of Kalman filter techniques. Each process submodel contained in the process model array 50 may be created to implement any one of a plurality of parameter estimation techniques. Further, the parameter estimation technique implemented for an individual submodel is not constrained to be the same as the parameter estimation technique implemented for any other submodel contained in the process model array 50.

The training procedure 20 is completed at training complete point 37 when all possible operating modes of the system 10 have been assessed. At this point, the process model array 50 includes parameter estimation models for each operating mode enabled by the designer. The process model array 50 is thereafter useful for performing surveillance of the asset 12.

Figure 3:
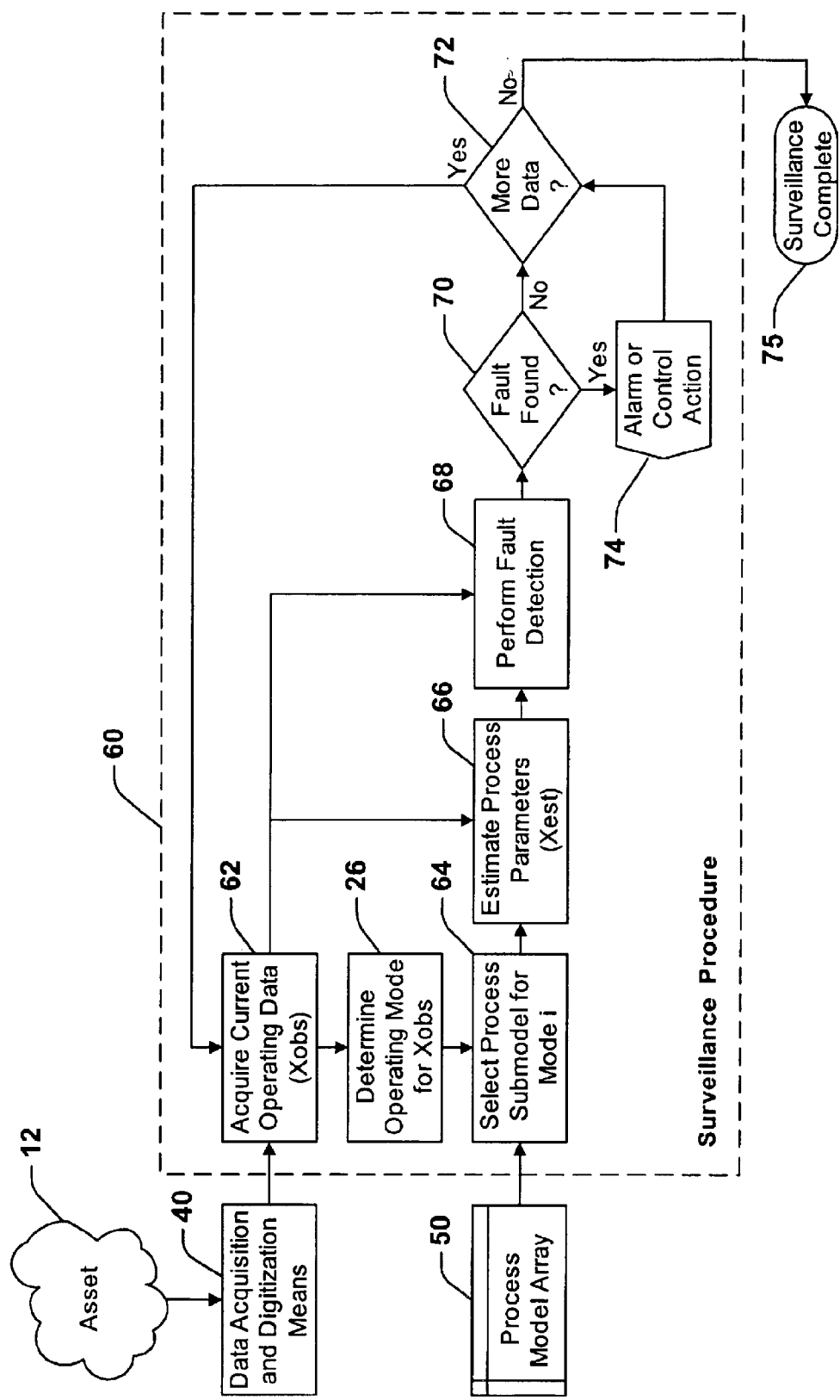
FIG. 3 is a schematic functional flow diagram of a method and system for performing surveillance of an asset using an operating mode partitioned array of parameter estimation models in an embodiment of the invention.

Description of the Surveillance Procedure:

More specifically, and referring to FIG. 3, the surveillance procedure 60 is comprised of acquiring successive vectors of current operating data and determining for each such observation vector whether the current operating data is indicative of a fault or failure of the asset 12. The surveillance procedure 60 further includes implementing an alarm or control action for the purpose of notifying an operator or taking a corrective action in response to a detected fault or failure of the asset 12. The surveillance procedure 60 is in general an open-ended data acquisition and analysis loop that continues until such time as the operator chooses to terminate the surveillance.

Again referring to FIG. 3, the surveillance procedure begins with an observation acquisition procedure 62 for acquiring a current vector of observed signal data values, herein denoted Xobs. Signal data values are acquired by the data acquisition means 40 using any combination of conventional electronic data acquisition hardware and signal processing software as noted supra. Next the operating mode determination procedure 26 is used to determine the operating mode for the current vector of observed signal data values, Xobs. It is essential only that the operating mode determination procedure 26 used during the surveillance procedure 60 is the same operating mode determination procedure 26 used during the training procedure 20. Upon determination of the current operating mode for the current observed signal data, the process submodel for the current operating mode is selected from the array of submodels contained in the process model array 50 using a process submodel selection procedure 64. The selected process submodel for the current operating mode is then used with a parameter estimation procedure 66 to produce a current vector of estimated signal data values, herein denoted Xest. It is essential only that the parameter estimation procedure 66 used during the surveillance procedure 60 is the same parameter estimation procedure 66 for which the process submodel was trained using the process submodel creation procedure 30 during the training procedure 20. The current vector of estimated signal data values, Xest, in general includes at least one estimated signal data value corresponding to at least one actual signal data value included in the current vector of observed signal data values, Xobs. A series of estimated signal data values produced by successive observation and parameter estimation cycles is termed herein a "virtual signal" for the signal parameter.

Still referring to FIG. 3, the current vector of estimated signal data values, Xest, may be in general compared to the current vector of observed signal data values, Xobs, using a fault detection procedure 68. The fault detection procedure 68 serves the useful purpose of determining whether the current vector of observed signal data values indicates a fault or failure of a component of the asset 12. The fault detection procedure 68 may be performed using any one of a plurality of comparative techniques including, but not limited to, evaluation of the current comparison result against numerical limit values, evaluation of the current comparison result using any one of a plurality of statistical hypothesis test techniques, evaluation of the current comparison result using any one of a plurality of expert system techniques, and evaluation of the current comparison result using any one of a plurality of neural network techniques. FIG. 3 illustrates the use of a mathematical difference (Xobs−Xest) to calculate the residual error between the observed and estimated signals but is not intended to preclude any other form of comparison whatsoever.

The results of the fault detection procedure 68 provide fault detection for the current vector of observed signal data values. In many cases, fault detection decision quality is improved by using a fault decision procedure 70 that incorporates logic for considering a series of observations in making the fault detection decision. The fault decision procedure 70 may be in general performed using any method suitable for ascertaining a fault of the asset 12 given a fault detection result or series of fault detection results therefrom. Methods suitable for the fault decision procedure 70 include, but are not limited to, single observation techniques (e.g., alarm on every detected fault), multi-observation voting techniques (e.g., alarm when X out of Y observations contain a fault indication), and conditional probability techniques (e.g., compute the fault probability given a series of fault detection results). Upon completing the fault decision procedure 70, the surveillance procedure then repeats for as long as a more data decision procedure 72 determines that additional surveillance data are available or terminates at surveillance complete step 75 when no more surveillance data are available.

Continuing to refer to FIG. 3, the usefulness of the instant invention is, inter alia, the improvement achieved in the accuracy of the fault detection decision made by the fault decision procedure 70. Improving the accuracy of the fault decision procedure 70 accomplishes a reduction in the number of false alarms sent to a process operator or control system that can in turn result in an erroneous alarm or control action by the alarm or control action procedure 74. Further, improving the accuracy of the fault decision procedure 70 accomplishes a reduction in the number of missed alarms thereby accomplishing more timely alarm or control action by the alarm or control action procedure 74. The instant invention thereby enables improved operating safety, improved efficiency and performance, and reduced maintenance costs for a wide variety of industrial, utility, business, medical, transportation, financial, and biological processes and apparatuses wherein such process and/or apparatus asset 12 preferably has at least two distinct modes or domains of operation.

Figure 4:
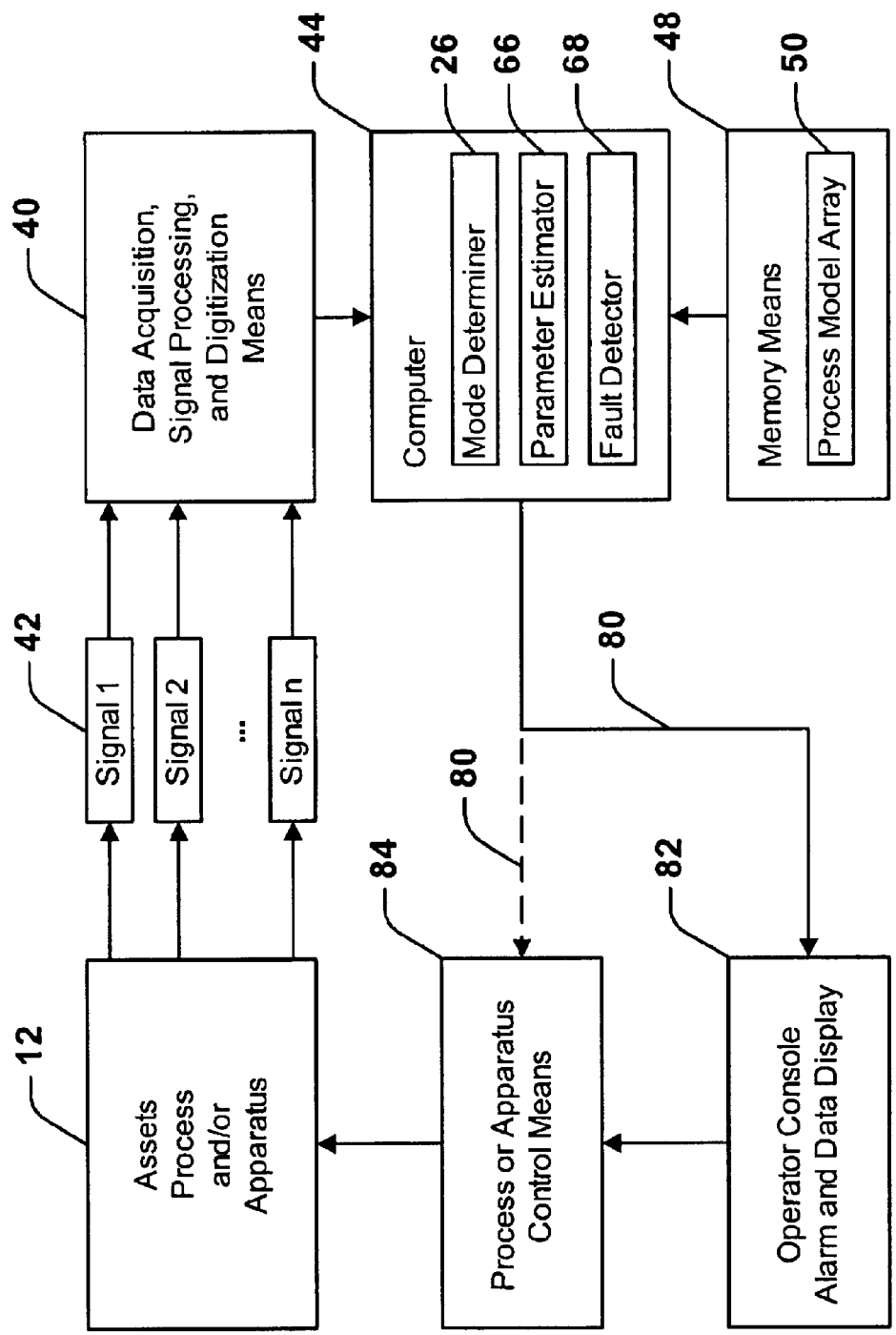
FIG. 4 is a schematic functional flow diagram of a surveillance procedure using an operating mode partitioned parameter estimation model in an embodiment of the invention.

FIG. 4 outlines a general surveillance procedure of the system 10 when employing the operating mode partitioned parameter estimation process model array 50. In a typical surveillance procedure, the asset 12 is the source of at least one process signal 42 that is acquired and digitized using conventional data acquisition means 40 for providing the data acquisition procedure for the purpose of computer-assisted surveillance. The digitized signal data is generally evaluated using a computer 44 having computer software modules implementing the operating mode determination procedure 26, the parameter estimation procedure 66, and the fault detection procedure 68. The operating mode determination procedure 26 is used to determine the current operating mode of the asset 12 given the acquired process signal data. The parameter estimation procedure 66 is used to produce an estimated signal value for at least one process signal 42 emanating from the asset 12. The parameter estimator procedure 66 in general makes use of the process model array 50 stored in a memory means 48 associated with the computer 44 to produce the estimated signal values. The specific process submodel selected from the process model array 50 and used by the parameter estimation procedure 66 is dependent on the operating mode determined by the operating mode determination procedure 26. The estimated signal values are then generally evaluated using the fault detection procedure 68 to identify faults or operating anomalies in the asset 12. The results of the fault detection evaluation are thereafter communicated by a conventional communications link 80 (as is known to those having ordinary skill in the art, and informed by the present disclosure) to an operator console 82 or automated process control system 84 for possible alarm and/or control action.

The computer 44 along with the associated memory means 48 can also be employed to perform the training and surveillance procedures 20, 60 as delineated supra and to store all the data associated with these procedures, for example, the historical operating data, the training data and process model array.

MSET Procedure:

In an embodiment of the invention, the method used for parameter estimation is a multivariate state estimation technique (MSET) procedure. The US Department of Energy's Argonne National Laboratory originally developed the implementation of MSET described herein for surveillance of sensors and components in nuclear power plant applications. However, other implementations of a multivariate state estimation technique are possible and useful in conjunction with the instant invention. MSET is in general a statistically derived parameter estimation algorithm that uses advanced pattern recognition techniques to measure the similarity or overlap between signals within a defined operational domain (set of process operating states). MSET "learns" patterns among the signals by numerical analysis of historical process operating data. These learned patterns or relationships among the signals are then used to identify the learned state that most closely corresponds with a new signal data observation. By quantifying the relationship between the current and learned states, MSET estimates the current expected response of the process signals. MSET then uses a form of statistical hypothesis testing, such as the sequential probability ratio test (SPRT) or similar probability ratio test algorithm (as shown in U.S. Pat. No. 5,459,675 and which is hereby incorporated by reference in its entirety) to compare the current estimated value of a signal with its observed value. The statistical hypothesis comparison test provides a sensitive and widely applicable method to detect a fault or failure in an asset. However, other implementations of the comparison test are possible and useful in conjunction with the instant invention.

An MSET model is created for the asset 12 using the MSET training algorithms to learn the inherent data relationships within a set of historical process operating data. The trained MSET model is then used with the MSET parameter estimation and fault detection algorithms to perform the process surveillance function when presented with a new observation of signal data values. The following sections will first provide a mathematical overview of the MSET algorithms and procedures useful for training a parameter estimation model and for using this trained model for process surveillance. The description is followed by a detailed description of an embodiment of the invention using a novel operating mode partitioned MSET process model array for parameter estimation and process surveillance.

Description of the MSET Training and Surveillance Procedures:

The MSET methods are generally described in the following two US Government documents produced and maintained by the US Department of Energy's Argonne National Laboratory, Argonne, Ill., disclosure of which is incorporated in its entirety herein by reference.

J. P. Herzog, S. W. Wegerich, R. M. Singer, and K. C. Gross, "Theoretical Basis of the Multivariate State Estimation Technique (MSET)," Argonne National Laboratory, ANL-NT-49, December 1997.

J. P. Herzog, S. W. Wegerich, K. C. Gross, and R. M. Singer, "MSET: Code Structure and Interface Development Guide," ANL-NT-48, August 1997.

The MSET algorithm uses pattern recognition with historical operating data from an asset to generate a parameter estimation model. If data are collected from a process over a range of operating states, these data can be arranged in matrix form, where each column vector (a total of m) in the matrix represents the measurements made at a particular state. Thus, this matrix will have the number of columns equal to the number of states at which observations were made and the number of rows equal to the number of measurements (a total of n signal data values) that were available at each observation. We begin by defining the set of measurements taken at a given time $t_j$ as an observation vector $X(t_j)$, $$\vec{X}(t_j) = [x_1(t_j), x_2(t_j), \ldots, x_n(t_j)]^T \quad (1)$$

where $x_i(t_j)$ is the measurement from signal i at time $t_j$. We then define the data collection matrix as the process memory matrix D:

$$\vec{D} = \begin{bmatrix} d_{1,1} & d_{1,2} & \cdots & d_{1,m} \\ d_{2,1} & d_{2,2} & \cdots & d_{2,m} \\ \vdots & \vdots & \vdots & \vdots \\ d_{n,1} & d_{n,2} & \cdots & d_{n,m} \end{bmatrix} \equiv [\vec{X}(t_1), \vec{X}(t_2), \ldots, \vec{X}(t_m)] \quad (2)$$

Each of the column vectors $(X(t_j))$ in the process memory matrix represents an operating state of the process. Any number of observation vectors can be assigned to the process memory matrix. Training an MSET model includes collecting enough unique observation vectors from historical operation of the process during normal conditions such that the process memory matrix encompasses the full dynamic operating range of the process. Computation of the D matrix is the first of three steps in the method for training an MSET model based on historical operating data.

One of at least two algorithms is used by MSET to select the vectors in the D matrix. The MinMax algorithm extracts vectors that bound the vector space defined by the training data and returns the smallest process memory matrix that will produce an effective system model (see also U.S. Pat. No. 5,764,509 and which is hereby incorporated by reference in its entirety). The Vector Ordering algorithm selects and includes representative vectors from the inner regions of the vector space producing a more accurate system model.

Once the process memory matrix has been constructed, MSET is used to model the dynamic behavior of the system. For each current observation of the system (Xobs), MSET compares the observation vector to the stored operating states to calculate an estimate of the process parameter values. The parameter estimate of the current process state (Xest) is an n-element vector that is given by the product of the process memory matrix and a weight vector, W:

$$\vec{X}_{est} = \vec{D} \cdot \vec{W} \quad (3)$$

The weight vector represents a measure of similarity between the estimate of the current state and the process memory matrix. To obtain the weight vector, we minimize the error vector, R, where:

$$\vec{R} = \vec{X}_{obs} - \vec{X}_{est} \quad (4)$$

The error is minimized for a given state when:

$$\vec{W} = (\vec{D}^T \otimes \vec{D})^{-1} (\vec{D}^T \otimes \vec{X}_{obs}) \quad (5)$$

This equation represents a "least squares" minimization when the pattern recognition operator $\otimes$ is the matrix dot product. Several advanced pattern recognition operators have been defined that provide excellent parameter estimation performance. Pattern recognition operators used by MSET include, but are not limited to, the System State Analyzer (SSA) method (see also U.S. Pat. No. 4,937,763 and which is hereby incorporated by reference in its entirety), the Bounded Angle Ratio Test (BART) method (see also U.S. Pat. No. 5,987,399 and which is hereby incorporated by reference in its entirety), the Vector Pattern Recognizer (VPR) method, the Vector Similarity Evaluation Technique (VSET) method, and the Probabilistic State Estimation Method (PSEM).

Once the weight vector is found, the resulting current state estimate of the system (i.e., the parameter estimate vector) is given by:

$$\vec{X}_{est} = \vec{D} \cdot (\vec{D}^T \otimes \vec{D})^{-1} \cdot (\vec{D}^T \otimes \vec{X}_{obs}) \quad (6)$$

The first application of the pattern recognition operator in equation (6) ($D^T \otimes D$) involves a comparison between the row vectors in the $D^T$ matrix and each of the column vectors in the D matrix. If we define $G = D^T \otimes D$, then G, the similarity matrix, is an m by m matrix. The element in the i-th row and j-th column of the matrix ($g_{i,j}$) represents a measure of the similarity between the i-th and j-th column vectors (i.e., memorized states) in the process memory matrix. The second application of the pattern recognition operator in equation (6) ($D^T \otimes X_{obs}$) involves a comparison between the row vectors in the $D^T$ matrix and each of the elements in the observation vector Xobs. If we define $A = D^T \otimes X_{obs}$, then A, the similarity vector, is an m by 1 vector. Each element in the similarity vector is a measure of the similarity between the observation vector and the i-th column vector (i.e., memorized state) in the process memory matrix.

Note that the similarity matrix is a function of the process memory matrix only. Thus, the similarity matrix and its inverse $Ginv = (D^T \otimes D)^{-1}$ can be calculated as soon as the process memory matrix has been derived thereby making the application of MSET to an on-line surveillance system more computationally efficient. Computation of the Ginv matrix initializes the process model and completes the second of three steps in the procedure for training an MSET model based on historical operating data.

The third and final step in the MSET training procedure includes analyzing the historical training data using equation (6) to characterize the expected statistical mean and variance of the residual error vector, R, for each signal parameter in the observation vector. The resulting mean vector, M, is later used in the surveillance procedure to normalize the residual error for each observation evaluated using the statistical hypothesis test. The resulting variance vector, V, is later used at the beginning of the surveillance procedure to initialize the fault detection threshold values used in the statistical hypothesis test.

Figure 5:
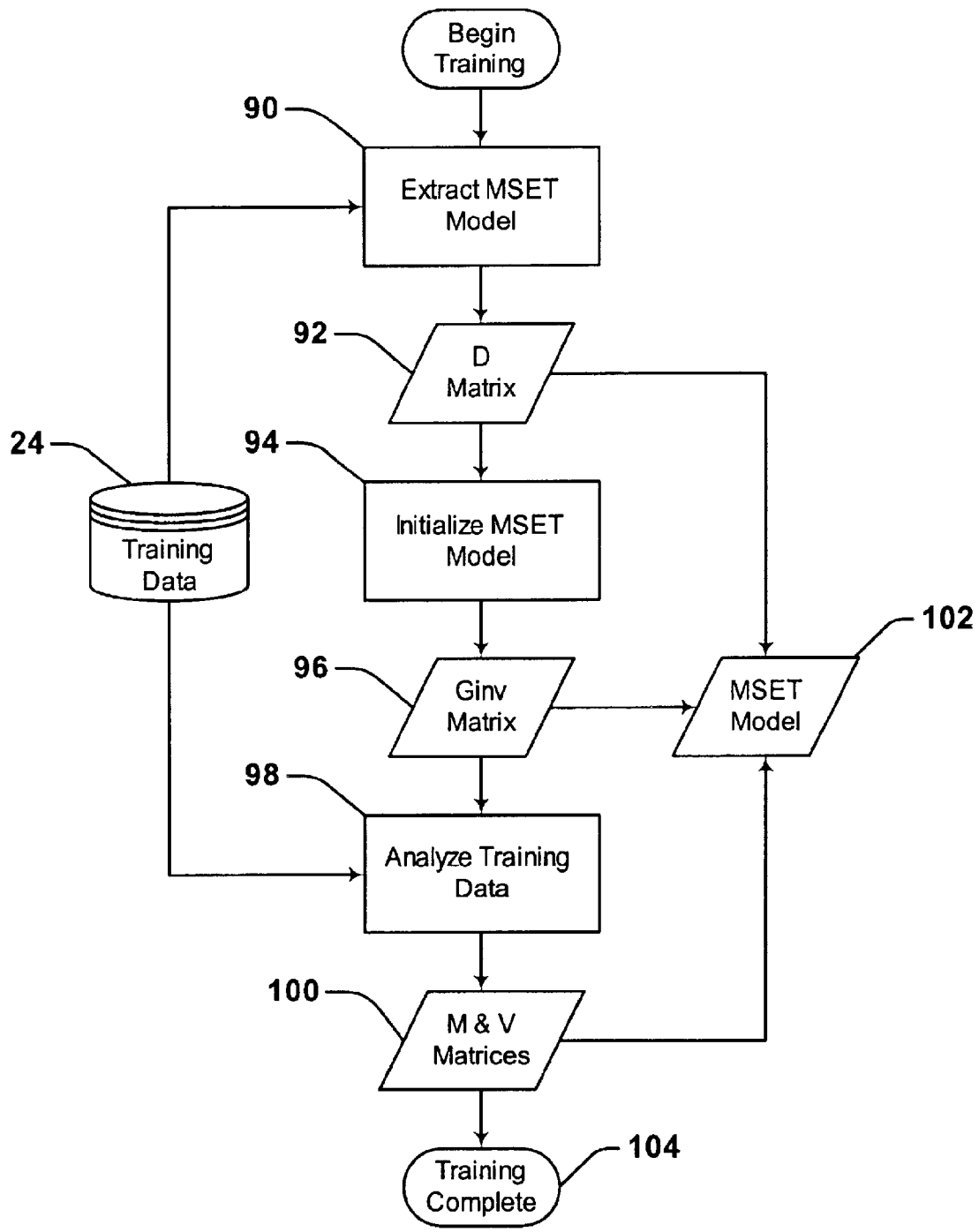
FIG. 5 is a schematic functional flow diagram of a method and system for the MSET training procedure in an embodiment of the invention.

FIG. 5 illustrates the procedure for training an MSET parameter estimation model. The procedure is used to produce an unpartitioned MSET model 102 that is not partitioned by operating mode. The MSET training procedure developed by Argonne National Laboratory (ANL) as described herein is embodied in one instance within the ANL software modules known as train.c and sys_mod.c. As described herein above, the MSET training procedure begins with a MSET model extraction procedure 90 used to populate a process memory matrix 92 (D) from the training data set 24 (historical process operating data). The MSET model extraction procedure 90 makes use of at least one of a plurality of observation vector extraction methods embodied in one instance within the ANL train.c software module, including but not limited to the MinMax method, and the Vector Ordering method. A MSET model initiation procedure 94 is the second step of the method and is used to initialize the MSET process model by the computation of a inverse similarity matrix 96 (Ginv). The MSET model initiation procedure 94 makes use of at least one of a plurality of pattern recognition operator methods embodied in one instance within the ANL sys_mod.c software module, including but not limited to the SSA method, the BART method, the VPR method, the VSET method, and the PSEM method. The third step of the MSET training procedure uses the process memory matrix 92 and the inverse similarity matrix 96 to perform a MSET training data analysis procedure 98 using the training data set 24. The MSET training data analysis procedure 98 computes the residual error mean and variance vectors 100 (M and V, respectively) over the training data. The MSET training procedure is in general performed once for the training data set 24 thus preparing an unpartitioned MSET model 102 for use in the MSET surveillance procedure.

In the MSET surveillance procedure, new operating data observations are evaluated sequentially using the unpartitioned MSET model 102 for the purposes of validating the data or discerning an anomalous (not normal) process operating condition. For each new observation vector, Xobs, presented to the MSET parameter estimation method, the memorized state having the greatest similarity to the current observed state is returned as a parameter estimate vector, Xest. Diagnostic decisions are then made on the basis of the difference (residual error) between the observed and estimated values for at least one process signal parameter contained in the estimate vector. MSET uses at least one of a plurality of statistical hypothesis test algorithms including, but not limited to, a Sequential Probability Ratio Test (SPRT) algorithm, and a Bayesian Sequential Probability (BSP) test algorithm to produce a fault indication based on the value of the residual error for at least one process parameter.

Figure 6:
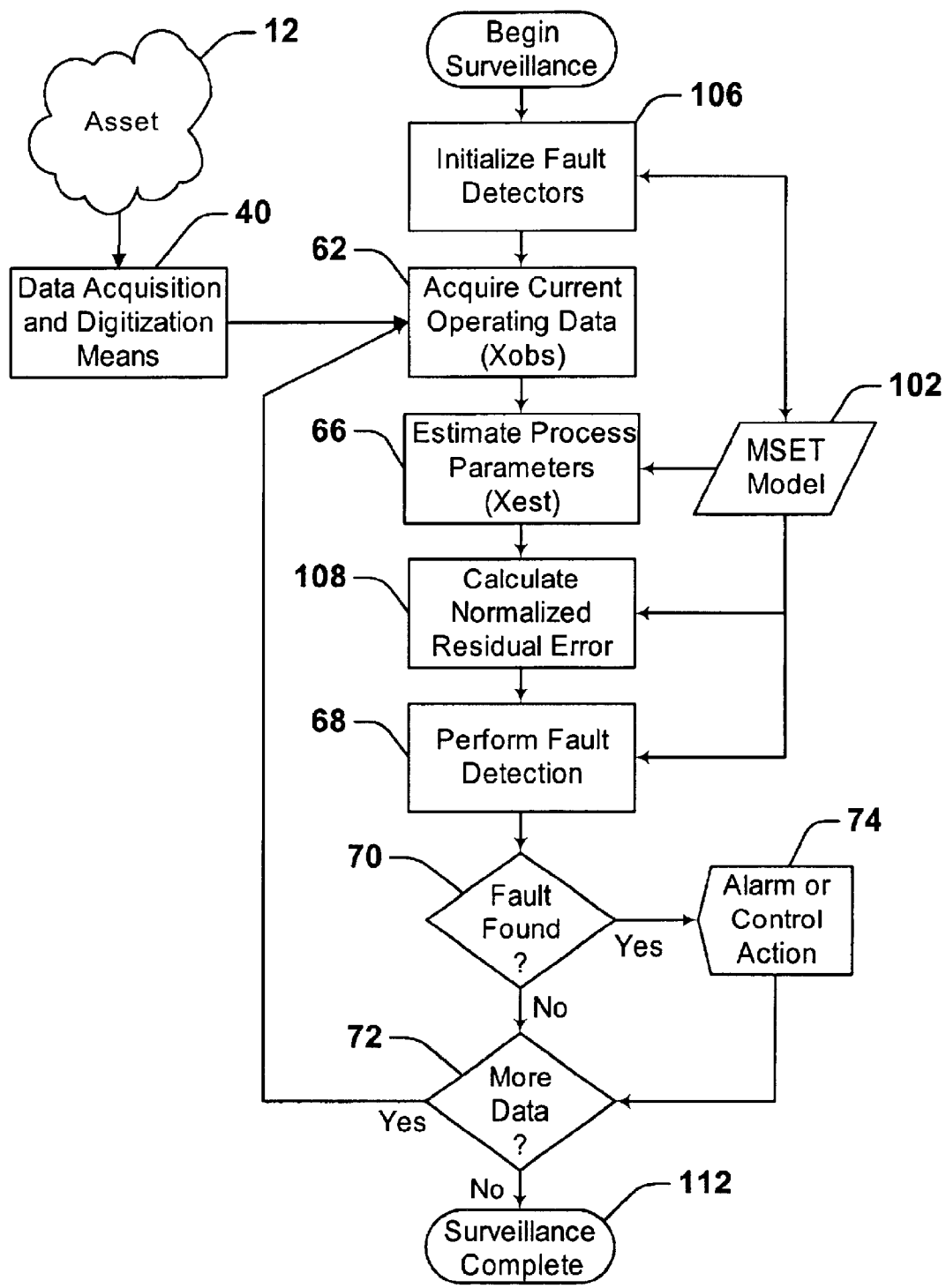
FIG. 6 is a schematic functional flow diagram of a method and system for the MSET surveillance procedure in an embodiment of the invention.

FIG. 6 illustrates the method and system for MSET-based surveillance. The MSET surveillance methods as described herein are embodied in one instance within the ANL software modules known as sys_mod.c and fault_detect.c. Prior to performing surveillance for new operating data observations, a MSET fault detector initialization procedure 106 is performed. The MSET fault detector initialization procedure 106 takes the variance (V) vector 100 and several other constants as its arguments. The initialization procedure makes use of one of a plurality of fault detection methods embodied in one instance within the ANL fault_detect.c software module, including but not limited to the SPRT method, and the BSP method. The MSET surveillance procedure then proceeds by sequentially acquiring and evaluating each new data observation until such time as surveillance is completed. Data observations are acquired using the observation acquisition procedure 62. For each new observation vector, Xobs, a parameter estimate vector, Xest, is produced by the parameter estimation procedure 66 using the unpartitioned MSET model 102 with the same pattern recognition operator that was used in the MSET training procedure. The residual error vector, R, is computed and is then normalized using a residual value normalization procedure 108 that includes subtracting the mean (M) vector 100 from the value of the residual error. The normalized residual vector is then evaluated using the same fault detection procedure 68 that was initialized at the start of the MSET surveillance procedure. If the fault detection procedure 68 results in a fault determination by the fault decision procedure 70, the alarm or control action procedure 74 communicates the fault information by the conventional communications link 80 (not shown) to the operator console 82 (not shown) and/or automated process control system 84 (not shown) for corrective action. In the fault decision procedure 70, a Bayesian conditional probability test is in general used to reach a fault decision based on a series of fault detection results from the fault detection procedure 68. The surveillance procedure then repeats for as long as the more data decision procedure 72 determines that additional surveillance data is available.

Limitations of the MSET Training and Surveillance Method and System:

In the method and system described above, MSET is trained by the construction of a process memory matrix, D, based on historical operating data from all normal operating states of the process. MSET creates the process memory matrix by selecting representative process data observations (herein termed observation vectors) that characterize the dynamic patterns inherent across all operating states of the process. However, if the process can operate in two or more distinct modes of operation, then the totality of operating states for all possible operating modes must be represented in the process memory matrix to produce an effective MSET model. As the number of distinct operating modes of process operation represented in the training data increases, one of two limitations occur:

Limitation 1. If the total number of observation vectors in the process memory matrix is fixed, then the number of data patterns used to represent any single operating mode of a process decreases. This directly reduces the accuracy of MSET's parameter estimates, which may result in false alarms or reduce the ability of the fault detection procedure to reliably detect subtle sensor failures or other process anomalies.

Figure 7:
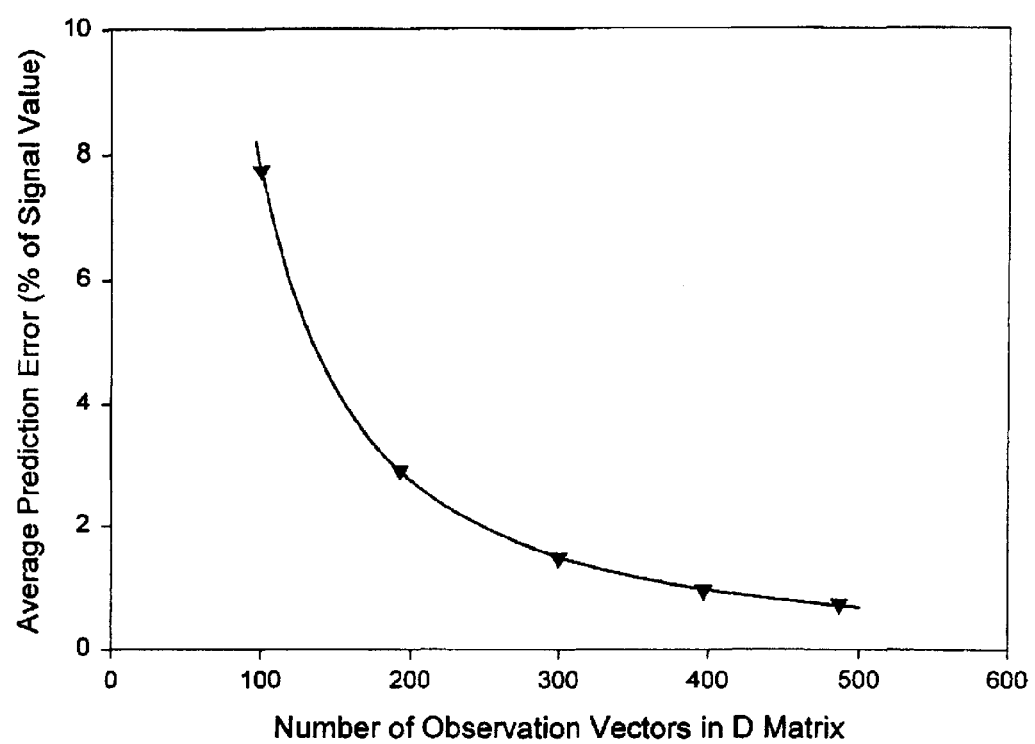
FIG. 7 illustrates the relationship between the overall MSET parameter estimation error and the number of observation vectors used in the process memory matrix when unpartitioned process modeling methods are used for MSET training and surveillance.

The parameter estimation accuracy of the MSET algorithm is in general an inverse power law function of the number of vectors in the process memory matrix. Limitation 1 is evident in the example of FIG. 7 that illustrates the overall parameter estimation error versus the number of vectors in the process memory matrix for an unpartitioned MSET model of six Space Shuttle Main Engine sensors.

Limitation 2. Allowing the number of observation vectors in the process memory matrix to increase ameliorates Limitation 1 above, but incurs a computational performance cost. The number of computer operations required for MSET to produce a parameter estimate scales with the square of the number of observation vectors stored in the process memory matrix. This is because the MSET parameter estimation algorithm must perform pattern matching between the current operating data vector and each element of the process memory matrix. Pattern matching uses the Ginv matrix, the size of which increases as the square of the number of observation vectors. Processing time for MSET parameter estimation has been empirically shown to follow a square law equation of the form:

Observation processing time (msec)=A+B*[Number of observation vectors in D]$^2$ (7)

Figure 8:
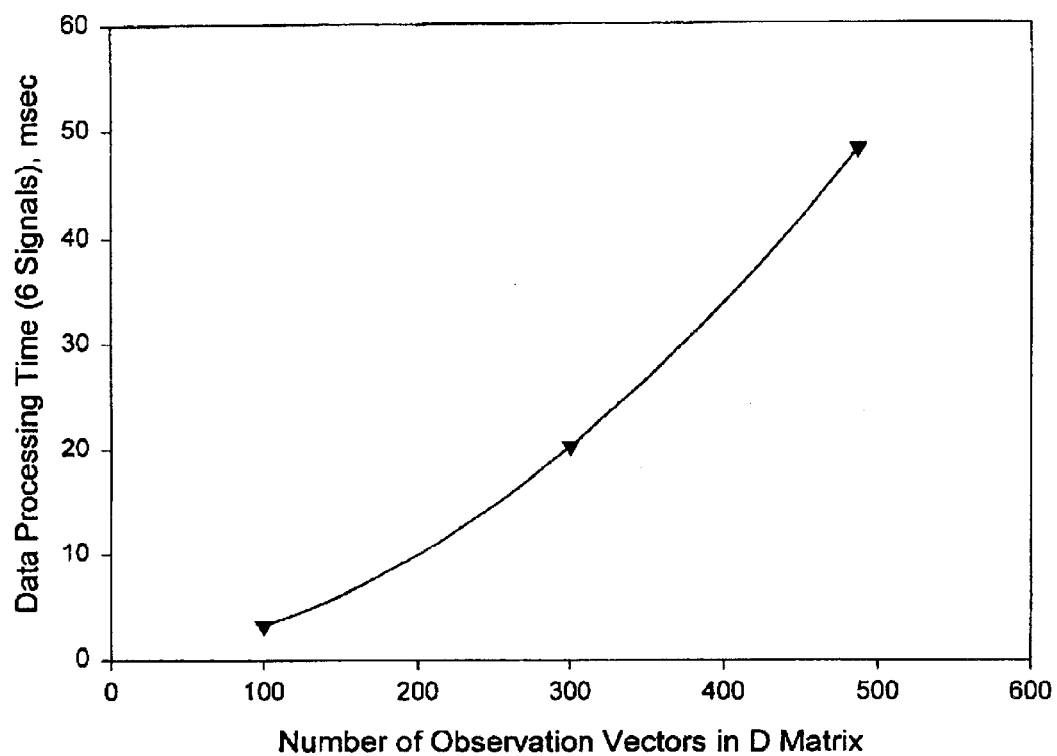
FIG. 8 illustrates the relationship between the data processing time required for producing an MSET parameter estimate and the number of observation vectors used in the process memory matrix when unpartitioned process modeling methods are used for MSET training and surveillance.

Limitation 2 is evident in the example of FIG. 8 that illustrates the overall MSET parameter estimation processing time on a 300-MHz Pentium II desktop computer versus the number of vectors in the D matrix for an unpartitioned MSET model of six Space Shuttle Main Engine sensors.

Novel Improvements to the MSET Training and Surveillance Procedures:

Having described the MSET training and surveillance methods herein above, this section describes the novel improvements made by the instant invention when used for MSET training and surveillance, said improvements being applicable to any asset preferably having at least two distinct modes of operation. It is explained herein above that it is beneficial to minimize the number of vectors in the process memory matrix in order to optimize the processing speed of the MSET algorithm. It is further explained herein above that the MSET methods require a trade-off to be made between processing time and parameter estimation accuracy. In the worst case, this trade-off results in unacceptable performance for a process surveillance application. The novel solution to this problem made by the instant invention is to use multiple coordinated MSET process submodels, with each submodel trained over a limited operating mode state space. With the instant invention, each submodel may be defined to contain only the minimum number of observation vectors required to adequately characterize a single specific operating mode or related subset of modes. Since only one submodel must be evaluated for each data observation presented to MSET during the surveillance procedure, both parameter estimation accuracy and processing speed are greatly improved.

The following example illustrates an unobvious benefit of the instant invention. Consider a process that requires on-line surveillance across multiple modes of operation. Further consider that the safety or other critical nature of said surveillance requires fault decision performance within a time interval that allows for on-line MSET processing with a process memory matrix containing at most 100 vectors. However, further suppose that the desired fault detection accuracy requires on-line MSET parameter estimation with a process memory matrix containing 300 vectors to adequately characterize the operating mode state space. In the prior art, both criteria could not be simultaneously satisfied. The instant invention solves this problem for many types of processes and apparatuses by enabling the MSET model designer to partition the operating mode state space and thus produce three 100 vector submodels providing the desired level of fault detection sensitivity (300 vectors) while having a processing speed comparable to the 100 vector model. This implementation requires only the addition of an operating mode determination procedure that selects the appropriate submodel for each new observation presented to the MSET system.

Improved MSET Training Procedure:

An array of MSET process submodels is termed an MSET process model array herein. An MSET process model array is one of a plurality of possible implementation specific instances of the process model array 50.

Figure 9:
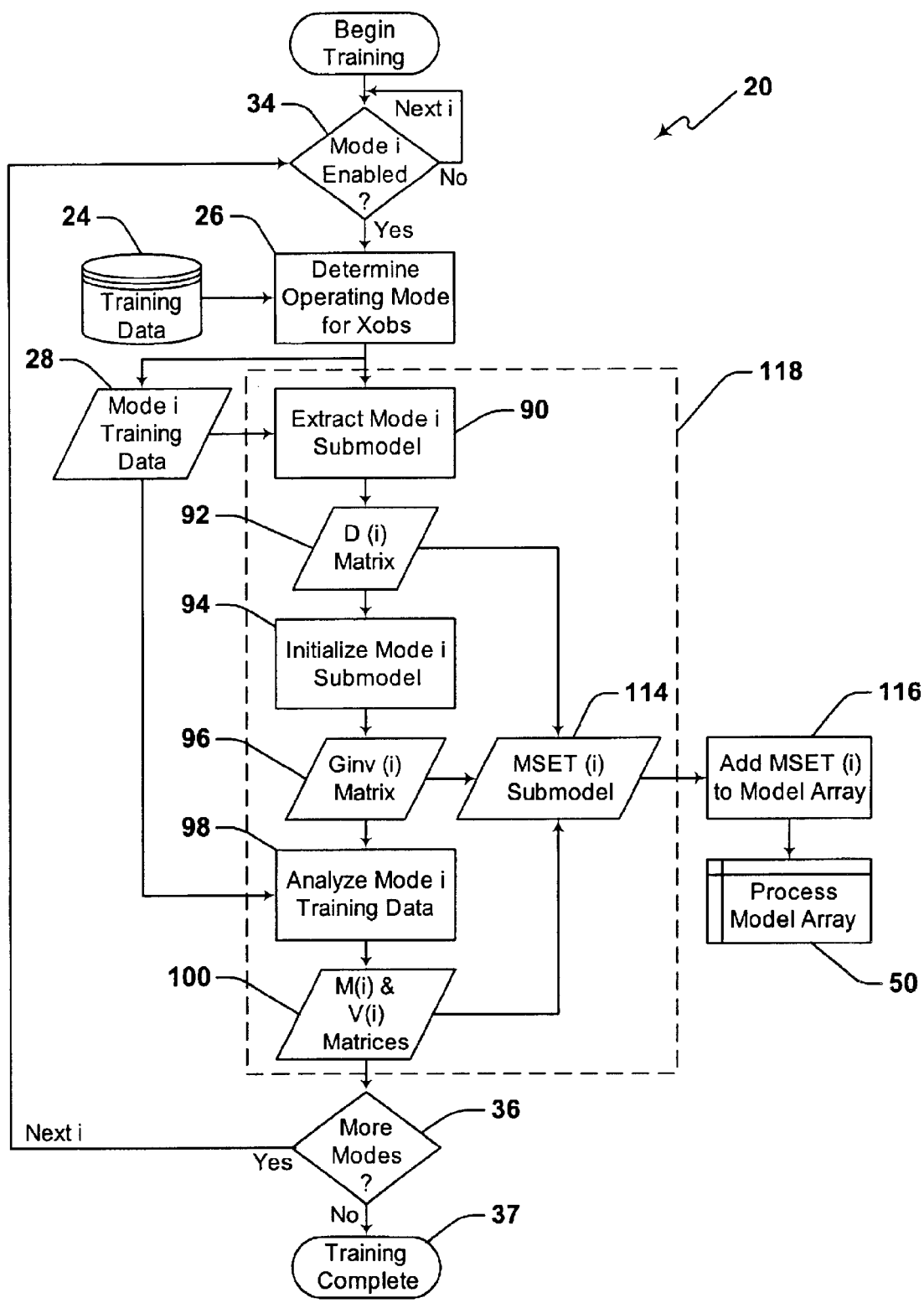
FIG. 9 is a schematic functional flow diagram of the training procedure for an embodiment using an operating mode partitioned array of MSET parameter estimation models in an embodiment of the invention.

FIG. 9 illustrates the training procedure 20 useful for producing process model array 50 or specifically a MSET process model array 50 in accordance with the instant invention. The training procedure includes and modifies the MSET training methods described in FIG. 5 and illustrated in FIG. 9 as MSET training procedure 118. With the instant invention, the MSET model designer may now individually specify those operating modes for which MSET training and surveillance is enabled. The training procedure loops through each defined operating mode with the loop controlled by the mode enabled decision procedure 34 and the more modes decision procedure 36. If the operating mode is enabled, a MSET process submodel 114 is created (this is a specific example of process submodel creation procedure 30 when employing MSET) for the operating mode. In order to create the MSET process submodel 114, the operating mode specific training data subset 28 is first extracted from the training data set 24 using the operating mode determination procedure 26. This operating mode specific training data subset 28 is then used to create the MSET process submodel 114 using the same procedures used in the MSET training procedure 118 to create an unpartitioned MSET model. Specifically, the MSET procedures used in sequence are the MSET model extraction procedure 90 to produce the process memory matrix 92, the MSET model initialization procedure 94 to produce the inverse similarity matrix 96, and the MSET training data analysis procedure 98 to produce the residual mean and variance vectors 100. Note that this series of procedures is grouped in the general case as the process submodel creation procedure 30. The process is repeated with each loop including a MSET process submodel storage procedure 116 to add the MSET process submodel 114 to the process model array 50 for each enabled operating mode. At the conclusion of the training procedure 20, the operating mode partitioned process model array 50 includes an array of individual MSET process submodels 114, one for each enabled operating mode.

The process model array 50 is a linear combination of the operating mode specific MSET process submodels. The process model array 50 includes the following at a minimum:

An array of process memory matrices 92 (D), one for each enabled operating mode;

An array of inverse similarity matrices 96 (Ginv), one for each enabled operating mode; and An array of residual mean and variance vectors 100 (M and V), one for each enabled operating mode.

Working together these process submodels provide parameter estimation over the entire operating mode state space that the designer has selected for surveillance. An additional novel feature of the instant invention is that each of the process submodels in the process model array 50 may be of unique dimensions, that is each submodel may contain unique numbers of modeled signal parameters and process memory matrix vectors. A process submodel's dimensions may be different than the dimensions selected for any other operating mode thereby permitting the unobvious benefit of further optimizing the MSET method and system for the surveillance requirements of each individual operating mode of the asset. This is important because certain modes of process operation are often more performance or safety critical than others.

An additional novel feature of the instant invention is that each of the process submodels in the process model array 50 may also be specified with unique parameter estimation and fault detector settings for each operating mode. This provides the unobvious benefit of optimizing MSET surveillance sensitivity and performance by operating mode. Examples of optimization by operating mode include, but are not limited to, the following:

Selection of the parameter estimation and training algorithm (e.g., the SSA, BART, VPR, VSET, PSEM, or other pattern recognition operator) by operating mode;

Selection of the SPRT, BSP or other fault detection algorithm by operating mode;

Selection of the fault detection procedure false alarm probability, missed alarm probability, system disturbance magnitude values, or other threshold constants by operating mode;

Selection of the fault decision procedure algorithm and associated thresholds and constants by operating mode.

Figure 10:
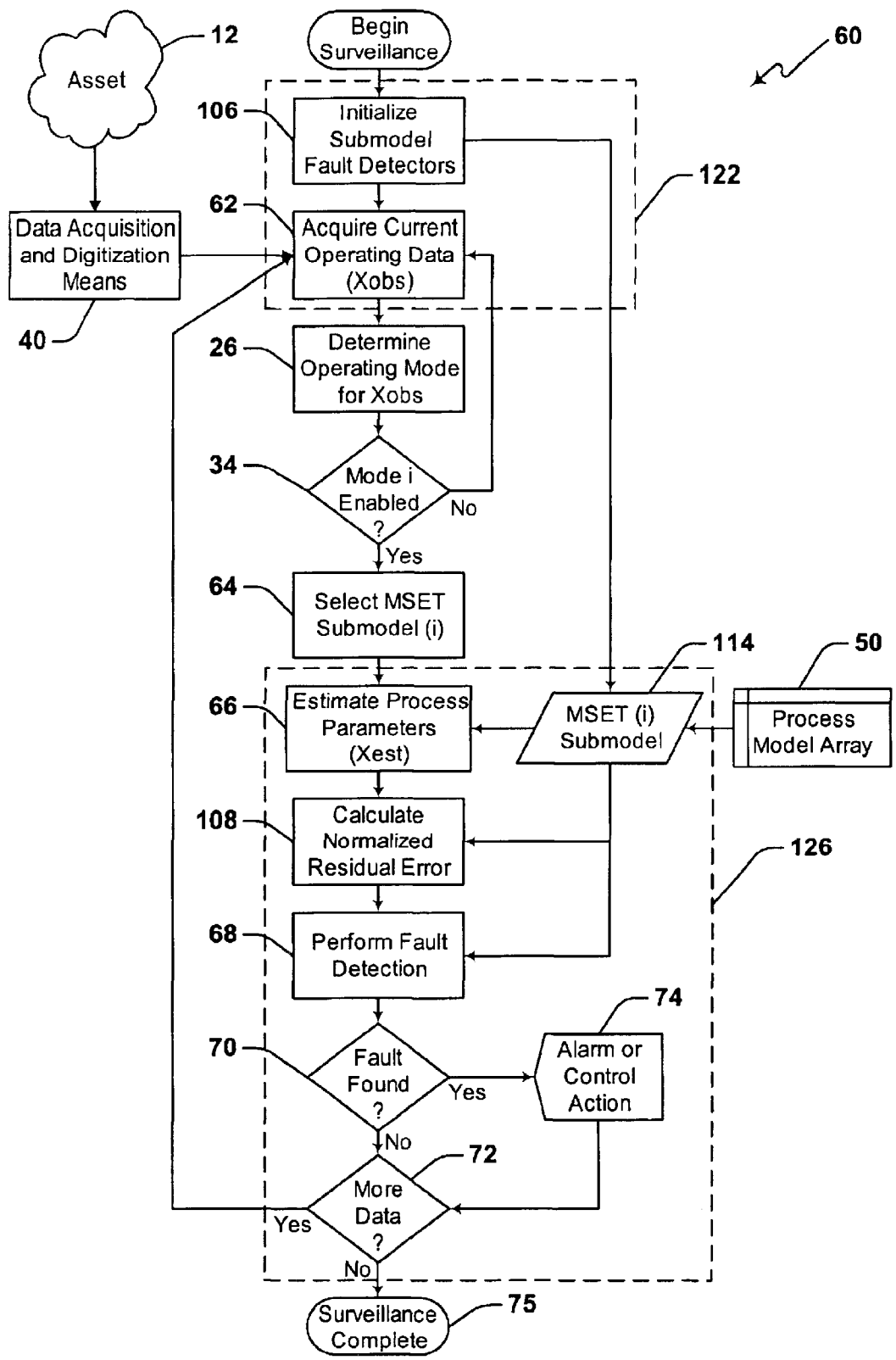
FIG. 10 is a schematic functional flow diagram of the surveillance procedure for an embodiment using an operating mode partitioned array of MSET parameter estimation models in an embodiment of the invention.

Improved MSET Surveillance Procedure:

FIG. 10 illustrates a novel method and system for the surveillance procedure 60 using the MSET process model array 50 as delineated hereinabove. The surveillance procedure 60 includes and modifies the MSET surveillance methods described in FIG. 6 and illustrated in FIG. 10 as MSET surveillance procedure 122, 126. With the instant invention, the MSET model designer may now individually specify those operating modes for which MSET surveillance is enabled.

At the beginning of the surveillance procedure, the fault detection procedures are initialized for each enabled process submodel. Initialization of each MSET process submodel 114 uses the same MSET fault detector initialization procedure 106 used for initialization of the unpartitioned MSET model 102. The surveillance procedure thereafter includes an open-ended loop for data acquisition and surveillance processing that is terminated by the more data decision procedure 72.

During surveillance, each new vector of observed signal data values, Xobs, is acquired using the data acquisition procedure 40 and the observation acquisition procedure 62. Next, the operating mode determination procedure 26 is used to determine the operating mode for each new data observation, Xobs, acquired from the asset 12. If the new data observation is determined by the mode enabled decision procedure 34 to represent an operating mode that is not enabled for MSET surveillance, no further processing is required until the next data observation is acquired from the asset 12. Conversely, if the new data observation is determined to represent an enabled operating mode, the correct MSET process submodel 114 is selected from the MSET process model array 50 using the process submodel selection procedure 64 and all required process submodel data is loaded into the computer memory. From this point, MSET surveillance processing occurs using the same procedures previously described for the MSET method. Once surveillance processing is completed, the procedure returns to acquire a new data observation from the asset 12.

An unobvious benefit of only performing MSET processing for selected operating modes is that the MSET process model array 50 does not need to provide parameter estimation capabilities for those operating modes that do not require on-line surveillance. For example, it may be desirable to exclude certain modes of operation (or non-operation) from the MSET process model array 50 even though such modes are included within the training data set 24. The ability to explicitly exclude operating modes that do not require surveillance simplifies the training data acquisition procedures and minimizes the on-line processing time required for a parameter estimation based surveillance method.

Neural Network Method and System for Determining Operating Mode of Asset:

A method to determine the operating mode of the asset 12 is required for both the training procedure 20 and the surveillance procedure 60 using an operating mode partitioned process model array 50. For each new data observation, the operating mode determination procedure 26 must classify the observation as belonging to exactly one of a plurality of defined operating modes thereby allowing the required process submodel to be selected for training or surveillance. The operating mode determination procedure 26 may use any form of algorithm that can determine the current operating mode of the asset 12 based on one or more data observations from the asset. The specific implementation or type of the operating mode determination procedure 26 does not affect or modify the operation of the instant invention.

In an embodiment of the invention, a Learning Vector Quantization (LVQ) neural network is used for the operating mode determination procedure 26. The LVQ neural network procedure is generally applicable to a wide range of assets. An LVQ neural network model is created for a specific asset using conventional neural network training algorithms to learn the inherent operating mode relationships within a set of historical process operating data. The trained LVQ model is then used to perform the operating mode determination procedure when presented with each new data observation. Because the LVQ neural network is trained by pattern matching a vector of observations from historical data, this type of neural network will always determine the most similar operating mode when presented with a new data observation.

An LVQ neural network is a two-layer, pattern classification neural network in which each output node represents a particular class or category.

Figure 11:
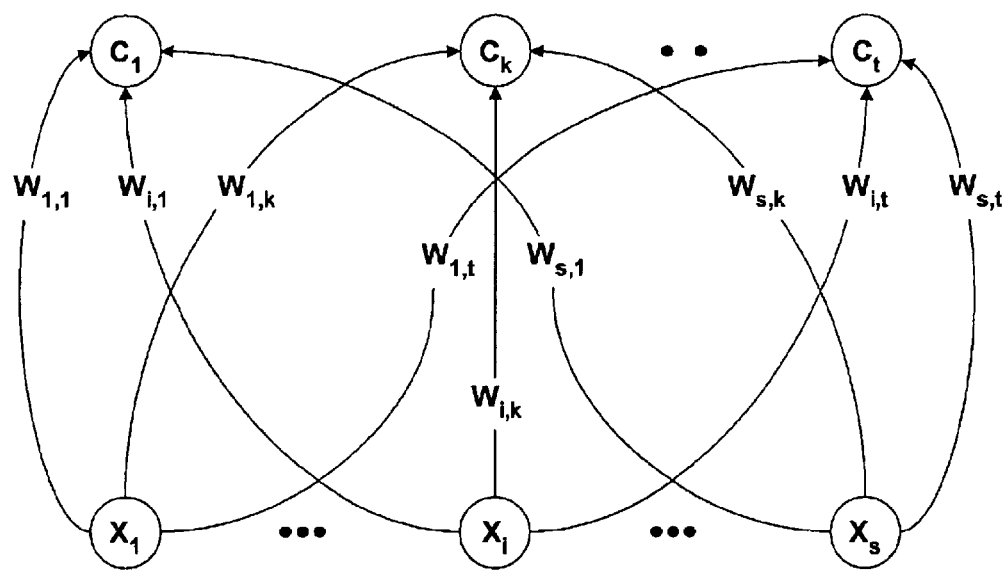
FIG. 11 is a schematic architecture diagram of a learning vector quantization neural network useful for classifying the operating mode of an asset in an embodiment of the invention.

FIG. 11 illustrates the architecture of an LVQ neural network. An LVQ network is one of a group of related pattern classification neural network models that can be used to cluster a set of s-element input vectors $\{X\}=\{x_1, \ldots, x_i, \ldots, x_s\}$ into t clusters. The input nodes of the neural network draw data either directly from sensor signals or from the output of a mathematical function applied to one or more sensor signals. An input vector is defined as the set of data values, one value for each input node that is derived from the sensor signals at a given moment in time. The output nodes of the network correspond to one of the classes (herein, the operating modes) recognized by the neural network. During operation of the neural network, an input vector is presented to the network, passes through the network, and activates one of the t output nodes ($y_1, \ldots, y_j, \ldots, y_t$). Each of the output nodes corresponds to one of the classes recognized by the neural network. The LVQ neural network returns the class corresponding to the activated output node, thereby determining the current operating mode of the asset.

The input nodes are connected to the output nodes by a set of connection weights. The subset of connection weights that connect all of the input nodes to one of the output nodes is called a weight vector. For example, output node $y_j$ is connected to the input nodes by weight vector $\{W_j\}=\{w_{1,j}, \ldots, w_{i,j}, \ldots, w_{s,j}\}$. An LVQ neural network that contains s input nodes and t output nodes would contain a total of t weight vectors, with each weight vector containing s connection weights.

An LVQ neural network is designed to recognize a predefined set of classes. Each one of the classes corresponds to a distinct operating mode of the asset under surveillance. During training of an LVQ neural network, the designer decides how many output nodes will be used to model each of the operating modes classified by the network. More than one output node can be used to represent a class (operating mode) recognized by the neural network. By using more than one node to represent a class, the number of neural network connection weights dedicated to that class is increased. This improves the ability of the neural network to recognize an operating mode of the asset. For each of the r classes, the designer specifies the number of output nodes that will model that class.

A supervised training scheme is used for training an LVQ neural network. In this scheme, training is accomplished by presenting a sequence of matched pairs of input vectors and target vectors to the neural network, causing some of the network's connection weights to be adjusted with each presentation of a training pair. The target vector $\{T\}=\{t_1, \ldots, t_i, \ldots, t_t\}$ is a set of binary values, one value for each output node in the network. An element of a target vector has a value of one if the corresponding output node represents the correct class for the input vector. Conversely, an element of a target vector has a value of zero if the corresponding output node represents an incorrect class for the input vector.

For each training pair presented to the LVQ network, the Euclidean distance between the input vector and each of the weight vectors is calculated. The Euclidean distances are then ordered, from smallest to largest. Only the weight vectors that produce the smallest two distances in the ordered sequence are allowed to learn. This form of learning is called competition, because only those weight vectors that produce the best scores (i.e., producing the minimum Euclidean distances) are modified during an iteration of the training algorithm. Three commonly used learning methods for training an LVQ neural network are herein designated LVQ1, LVQ2.1, and LVQ3.

In the first learning method (LVQ1), only the weight vector that is closest to the current input vector (i.e., the weight vector that produces the minimum Euclidean distance) is allowed to learn. For each matched pair of input and training vectors presented to an LVQ network during training, the Euclidean distance between the input vector and each of the weight vectors is calculated and the output node connected to the weight vector that produces the minimum Euclidean distance is identified. If the output node that produces the minimum Euclidean distance corresponds to the correct operating mode, the connection weights for the output vector are positively reinforced as follows. Let the subscript j represent the output node whose weight vector produces the minimum Euclidean distance. If the target value for that output node is 1 (i.e., $t_j=1$), then the weight vector for the output node ($W_j$) is updated by $$\vec{W}_j = \vec{W}_j + \lambda(\vec{X} - \vec{W}_j) \quad (8)$$

where X is the current input vector and $\lambda$ is a scalar parameter called the learning rate that varies from 0 to 1. If the output node whose weight vector produces the minimum Euclidean distance corresponds to the incorrect operating mode (i.e., $t_j=0$), the connection weights for the output vector are negatively reinforced by $$\vec{W}_j = \vec{W}_j - \lambda(\vec{X} - \vec{W}_j) \quad (9)$$

In the second (LVQ2.1) and third (LVQ3) learning methods, the two weight vectors that are closest to the current input vector are identified. These two weight vectors may be positively or negatively reinforced depending upon a number of conditions. The most important of these conditions is that the two weight vectors are modified only if they are roughly equidistant from the input vector. A user-defined control parameter ($\epsilon$), called the window size, is used to determine whether or not the two weight vectors are of comparable distances from the input vector. The window condition test that must be satisfied by the two closest weight vectors is that the ratio of distance between the closest weight vector and the input vector ($d_{c1}$) to the distance between the second closest weight vector and the input vector ($d_{c2}$) must fall within the window. Namely, $$\frac{d_{c1}}{d_{c2}} > 1 - \varepsilon \text{ and } \frac{d_{c2}}{d_{c1}} < 1 + \varepsilon \quad (10)$$

The window size is a small user-defined constant with typical values in the range $0.1 < \epsilon < 0.5$.

In the LVQ2.1 algorithm, a second condition that must be met is that one of the two closest weight vectors connects to an output node of the same class as the input vector. While at the same time, the other weight vector must connect to an output node of a class that differs from the class of the input vector. If both the window and class conditions are met, then the weight vector whose output node belongs to the same class as the input vector is positively reinforced according to equation (8). Also, the weight vector whose output node belongs to a class that differs from that of the input vector is negatively reinforced according to equation (9).

In the LVQ3 algorithm, the two weight vectors that are closest to the input vector are allowed to learn as long as the same window and class conditions as in the LVQ2.1 algorithm are met. The LVQ3 algorithm contains an additional learning mode. If the two weight vectors that are closest to the input vector meet the window condition (i.e., the conditions in equation (10) are met), and if both weight vectors connect to output nodes that are of the same class as the input vector, then both weight vectors are positively reinforced. Both weight vectors are updated by $$\vec{W} = \vec{W} + \delta\lambda(\vec{X} - \vec{W}) \quad (11)$$

where $\delta$ is a user-defined parameter, called the LVQ3 multiplier, that reduces the learning rate. The LVQ3 multiplier is a small constant with typical values in the range $0.1 < \delta < 0.5$.

The concept behind the LVQ2.1 and LVQ3 learning methods is that as the input vectors used for training are presented to the neural network, learning occurs only when an input vector is close to two of the weight vectors. In this case, the input vector is near the boundary between two weight vectors. Learning occurs in the LVQ2.1 algorithm only if one of the weight vectors belongs to the same output class as the input vector and the other weight vector belongs to a different class. The weight vector belonging to the correct class is positively reinforced and the other vector is negatively reinforced. The LVQ3 algorithm contains the same conditions as the LVQ2.1 algorithm. But an additional condition in the LVQ3 algorithm allows the network to learn, at a slower rate, if both weight vectors belong to the same class as the input vector. Over the course of the iterative training procedure, this technique works to sharply define the boundaries between the vector spaces recognized by each weight vector.

A set of input vectors and corresponding target vectors are used to train the LVQ neural network. The set of input and target vectors is presented to the network and the connection weights are adjusted depending upon the learning algorithm selected. Then, the learning rate parameter ($\lambda$) is decreased by a small amount and the set of input and target vectors is passed through the network again. The cycle is repeated until the learning rate decreases to zero or until the error rate for the neural network converges. Each training cycle of data presentation and learning rate reduction is called an epoch. The maximum number of epochs ($n_{eps}$) to be performed by the training algorithm is a user-defined control parameter. The learning rate decreases linearly with epoch number, with the learning rate decreasing to zero when the maximum number of epochs is reached. The initial value of the learning rate ($\lambda_0$) is a user-defined control parameter that, along with the maximum the number of epochs, determines the rate at which the learning rate is decreased. Specifically, the learning rate is decreased by a factor of $n_{eps}/\lambda_0$ at the end of each epoch.

During each training epoch, the error rate for the neural network is calculated. The error rate is defined to be the fraction of input vectors that are incorrectly classified by the neural network. An input vector is correctly classified if the weight vector that is closest to it connects to an output node of the same class as the input vector. As each input vector in the training set is passed through the LVQ neural network during a training epoch, the program notes if the input vector was correctly or incorrectly classified. The error rate is then given by the ratio of the number of incorrectly classified input vectors to the total number of input vectors in the training set. By keeping track of the error rate, the training algorithm can be halted as soon as the neural network stops learning.

The learning methods devised for the LVQ neural network are fine-tuning procedures. Only slight modifications are made to the network weight vectors during any training epoch. Therefore to minimize the number of epochs needed to train the neural network, the initial values of the weight vectors must be chosen wisely. The simplest method of initializing the weight vectors is to randomly select t vectors from the set of input vectors used to train the neural network and use them as initial values for the weight vectors, where t is the number of output nodes in the network. Although this initialization method works, a better method, which in general reduces the number of epochs needed to adequately train the network is to use the K-means clustering algorithm to set the initial values of the weight vectors. The K-means clustering algorithm is a method that will divide a vector space into K clusters and identify the centers of each cluster. The K-means clustering algorithm can be used to divide the input vectors used to train the LVQ network into t clusters and use the centers of the clusters as the initial values for the weight vectors.

The K-mean clustering algorithm is used to initialize the weight vectors as follows. For each of the r classes recognized by the network, the input vectors that belong to each class are identified and collected into r arrays. Next the output nodes that belong to each class are identified. By definition, the number of output nodes that belong to each class is given by the nodes-per-class vector ($N_{class}$). Then for each class, the K-means clustering algorithm is used to cluster the input vectors that belong to the class into a number of clusters that equals the number of output nodes that belong to the class. For instance for class j, the K-means clustering algorithm is used to divide the input vectors into $nout_j$ clusters and to evaluate the centers of the clusters. The cluster centers for class j are used to initialize the weight vectors whose output nodes belong to the class. The K-means clustering algorithm evaluates cluster centers for the class by minimizing the Euclidean distances between each of the input vectors in the class and the cluster center nearest to each. Thus, each cluster center is the mean value of the group of input vectors in a cluster domain. The K-means clustering algorithm was found to improve the recall capabilities of the neural network over the random initialization scheme, at a minimal increase in the computational cost of the training calculations.

A trained LVQ neural network operates as follows. At a point in time, a current data observation is acquired from the asset 12 and an input vector is constructed. The Euclidean distance between the input vector and each of the weight vectors is calculated. The weight vector producing the minimum Euclidean distance is found and its corresponding output node is activated. The neural network declares the operating mode corresponding to the activated output node to be the current operating mode of the asset 12 under surveillance.

In Use and Operation: Determining Asset Operating Mode Using Partitioned Model:

Operating mode partitioned MSET processing was first reduced to practice by applicant in the performance of NASA Contract NAS4-99012 cited hereinabove. Testing performed under this contract conclusively demonstrated the reduction to practice for and unobvious benefits of the instant invention. The contract final report and new technology disclosure documents by applicant, delivered to the United States Government under this contract and listed herein below, further describe one embodiment and its reduction to practice, the disclosure of which is incorporated in its entirety herein by reference.

NASA SBIR Phase I Final Report, "System State Determination for Real-Time Sensor Validation," NASA Contract NAS4-99012, Jun. 12, 1999. Publication or disclosure restricted to US Government personnel for four years pursuant to Code of Federal Regulations 48 CFR 52.227-20.

New Technology Report for NASA Contract NAS4-99012, "Phase Partitioning the Multivariate State Estimation Technique (MSET) Process for Improved Parameter Estimation Performance and Processing Speed," Expert Microsystems, Inc. Document Control Number 2000-4446, Jan. 24, 2000. Publication or disclosure restricted to US Government personnel for four years pursuant to Code of Federal Regulations 48 CFR 52.227-20.

New Technology Report for NASA Contract NAS4-99012, "System State Classification Using A Learning Vector Quantization (LVQ) Neural Network," Expert Microsystems, Inc. Document Control Number 2000-4447, Jan. 24, 2000. Publication or disclosure restricted to US Government personnel for four years pursuant to Code of Federal Regulations 48 CFR 52.227-20.

In the performance of NASA Contract NAS4-99012, a sensor validation software module was designed to validate seventeen (17) mission critical telemetry signals for the Space Shuttle Main Engine (SSME), as listed in FIG. 13. These signals were selected based on their importance for real-time telemetry monitoring of the three Space Shuttle Main Engines during vehicle ascent to orbit. The names listed in FIG. 13 use standard SSME nomenclature. Data from ten nominal Space Shuttle flights, with flights and engine positions as listed in FIG. 14, were selected as the training data for the MSET submodels and LVQ neural network used in the performance of this work.

A series of parametric studies were performed to determine the LVQ neural network configuration and training constants that provide the best performance for SSME operating mode determination. The neural network configuration and training constants selected for applicant's reduction to practice are defined in FIG. 12. Ten SSME flight data sets, defined in FIG. 14, were used to train the neural network. The operating mode determination capability of the LVQ neural network was shown to be excellent with operating mode classification error rates of less than 2% observed in testing with additional SSME flight data sets that were not used for training the neural network. Specifically, FIG. 15 illustrates three versions of the sensor validation software module. The first sensor validation software module, herein denoted the PD module, was created by the methods of the instant invention with a process memory matrix (D) of 150 vectors for each operating mode partitioned MSET process submodel in the process model array. The PD module's MSET process submodels were created using an LVQ neural network for the operating mode determination procedure. The second sensor validation software module, herein denoted the A150 module, was created by the unpartitioned MSET model creation procedure with a process memory matrix (D) size of 150 vectors used in the unpartitioned MSET model. This enabled a direct comparison of surveillance performance between the operating mode partitioned (instant invention) and unpartitioned models given a constant processing time. The third sensor validation software module, herein denoted the A300 module, was created by the unpartitioned MSET model creation procedure with a process memory matrix (D) size of 300 vectors used in the unpartitioned MSET model. The A300 module enabled improved surveillance performance for the unpartitioned MSET model case, albeit at the cost of greater processing time.

FIG. 15 further lists the parameter estimation model and fault detector configurations used for feasibility testing.

The operating mode partitioned sensor validation module (denoted PD) incorporated an MSET process model array partitioned into seven (7) modes representative of the primary operating modes of the SSME. The rules used for partitioning the training data for the SSME operating modes are provided in FIG. 16. The two unpartitioned sensor validation modules (denoted A150 and A300) were prepared using exactly the same training data without the benefit of operating mode partitioning.

The System State Analyzer (SSA) type pattern recognition operator was used in all of the MSET models. The fault detection models were all based on the SPRT mean positive and mean negative test methods. SPRT is a statistically derived test statistic with an explicit, non-zero false alarm probability. For this reason, SPRT fault detectors are generally used in combination with a multi-cycle fault decision algorithm to filter out the possible one-cycle SPRT alarms. The fault decision procedure was configured using a four (4) out of seven (7) multi-cycle decision algorithm. This fault decision procedure will declare a sensor failure whenever any 4 of the last 7 observation cycles produce any type of one-cycle SPRT fault detection alarm.

Performance testing clearly demonstrated the feasibility and benefits of using the operating mode partitioned MSET process model array for real-time sensor signal validation. Metrics used to evaluate the test results included the following:

Total One Cycle Alarm Count—This is a measure of the total number of SPRT fault detector generated alarms for a single simulation run. For nominal cases, this is expected to be a near zero number. For failure simulation cases, the number will be non-zero. This metric provides a measure of the overall performance of the fault detection procedure.

Average Parameter Estimation Error Percentage—This is a measure of the globally averaged parameter estimation error. The global averaged error is the sum of the single cycle error for all sensors and data observations divided by the total number of sensors and data observations. This metric provides a measure of the overall performance of the parameter estimation procedure.

Average One Cycle Processing Time—This is a measure of the globally averaged single cycle validation processing time. The one cycle processing time is the sum of the processing time for all validated data observations divided by the total number of validated data observations. The processing time is calculated as the elapsed time between the time of the test driver's call to the sensor validation module's surveillance procedure and the time that the surveillance procedure returns its results to the test driver.

Time to Failure Detection (Failure Simulations Only)—This is a measure of the elapsed time between the first observation containing sensor failure data and the observation for which the sensor validation module declares the sensor failed. Time to fault detection depends on the diagnostic capability of the sensor validation module, the time of failure occurrence and the nature and magnitude of the sensor failure. The data herein report the elapsed mission time between the initiation of a slow drift in the signal and the time that the drift failure was detected. For consistency, all test cases herein used a drift magnitude of 0.2% of the nominal, full power level value of the sensor signal applied per second of engine operating time.

Signal Error at Failure Detection (Failure Simulations Only)—This is a measure of the total accumulated drift error in a sensor signal at the time of failure detection. The data reported herein normalize the error at the time of detection in terms of a percentage of the nominal, full power level value of the sensor signal.

The results tabulated in FIGS. 17 through 22 demonstrate the very significant improvement in sensor validation performance achieved using the operating mode partitioned MSET process model array in accordance with the instant invention. The operating mode partitioned MSET process model array provided better fault detection sensitivity, lower parameter estimation error, and much faster processing time in comparison to the unpartitioned MSET models. The operating mode partitioned MSET process model array exhibited zero (0) false alarms and zero (0) missed alarms during all testing performed. The results tabulated in FIGS. 17 and 18 were generated using an LVQ neural network for the operating mode determination procedure.

Two test series were performed for comparison of the operating mode partitioned sensor validation module to the unpartitioned modules. In the first series, an unpartitioned model with a process memory matrix of 300 vectors was constructed (denoted A300). The operating mode partitioned model (denoted PD) used a process memory matrix of 150 vectors for each individual operating mode. When compared to the 300 vector unpartitioned model, the operating mode partitioned process model array in accordance with the instant invention demonstrated:

34% reduction in parameter estimation error;

73% reduction in per cycle processing time;

73% reduction in time to detect a sensor signal drift;

73% reduction in the total signal error at drift failure detection.

In addition, the 300 vector unpartitioned model missed two subtle noise failures that were properly detected by the operating mode partitioned process model array in accordance with the instant invention.

In the second series, the operating mode partitioned process model array was compared to an unpartitioned model of equivalent run-time speed. To accomplish this, an unpartitioned model with a process memory matrix of 150 vectors was constructed (denoted A150). When compared to the 150 vector unpartitioned model, the operating mode partitioned process model array in accordance with the instant invention demonstrated:

42% reduction in parameter estimation error;

Equivalent per cycle processing time;

77% reduction in time to detect a sensor signal drift;

76% reduction in the total signal error at drift failure detection.

In addition, the 150 vector unpartitioned model produced two sensor failure false alarms and missed one noise failure in cases that were properly detected by the operating mode partitioned process model array in accordance with the instant invention.

The operating mode partitioned process model array provides better fault detection sensitivity because the operating mode specific MSET process submodels are better able to estimate the current value of each observed parameter. This capability of the operating mode partitioned process model array is demonstrated by the reduction achieved in the parameter estimation error. Reduced parameter estimation error allows the SPRT thresholds for fault detection to be set to lower values thereby making the sensor validation model more sensitive to the early indications of sensor failure (fewer missed alarms). This phenomenon proportionally reduces the time to drift failure detection as illustrated by comparison of the results reported in FIG. 18 to the results reported in FIG. 20 and FIG. 22.

Parameter estimation error may be traded off against processing time by increasing the number of vectors in the process memory matrix. As is evident by comparison of FIG. 19 and FIG. 21, doubling the process memory matrix size increased the single cycle processing time by a factor of four ($2^2$). Operating mode partitioning provides an effectively larger process memory matrix without the concomitant penalty in processing time. For example, the operating mode partitioned SSME sensor validation module (PD) includes seven active operating modes with process memory matrices sized at 150 vectors per mode. This provides an effective process memory matrix size of 1050 vectors with processing speed equivalent to a process memory matrix containing 150 vectors. A single unpartitioned model of equivalent accuracy would be 49 ($7^2$) times slower than the operating mode partitioned process model array.

Processing speed results demonstrated the real-time monitoring capability of the operating mode partitioned process model array. Single observation processing times of 5-msec (200 samples/second) were demonstrated with the seventeen (17) sensor SSME sensor validation module running on a 300-MHz Pentium II processor. It is reasonable to allocate between 2 and 50-msec per data cycle for sensor validation processing in SSME real-time control applications. The results of this testing show these goals are only attainable with operating mode partitioning of the MSET model in accordance with the instant invention. The unobvious benefits of the instant invention are therefore demonstrated by this reduction to practice.

Alternate Embodiment and in Use and Operation Using a MSET Process Model Array for Parameter Estimation and a Rule-Based Logic Sequence for Determining the Operating Mode of the Asset:

In another embodiment, the same MSET process model array methods and procedures described hereinabove were used with a rule-based logic sequence for the operating mode determination procedure 26. A rule-based classifier is generally specific to a single type of asset and may be implemented in a plurality of forms. A rule-based classifier may use expert system or procedural logic depending on the nature and complexity of the operating modes of the asset. In one embodiment herein, procedural logic representing the rules specified in FIG. 16 for determining the operating mode of the SSME was reduced to practice using C language procedural software as follows.

```
---------- Begin Source Code Listing ----------
/* SSME operating mode determiner function    */
/* Copyright 1999 by Expert Microsystems, Inc.  */
/* All Rights Reserved                          */
#define START_COMMAND 33024.0
#define SHUTDOWN_COMMAND 35328.0
#define COMMAND_ISSUED(COMVAL,DATUM)
((DATUM > (COMVAL - 1.0))
    && (DATUM < (COMVAL + 1.0)))
enum SSME_modes SSME_mode_determiner
(double *data, enum Boolean initialize)
{
    float pc;      /* Combustion chamber pressure */
    float vehcom;  /* Vehicle command code */
    float compc;   /* Commanded chamber pressure */
    static float last_PL=0.0;
    static int cycles_in_start=0
    static float last_compc=0.0;
    static enum SSME_modes last_state=PREFIRE;
    if(initialize) {
        last_PL = 0.0;
        cycles_in_start = 0;
        last_compc = 0.0;
        last_state = PREFIRE;
        return PREFIRE;
    };
pc = data[PID63];      /* Chamber pressure is PID63 */
vehcom = data[PID280]; /* Vehicle command is PID280 */
compc data[PID287];    /* Commanded chamber pressure is PID287 */
/* Take care of special cases first . . . */
if (last_state == PREFIRE) {
    if (COMMAND_ISSUED (START_COMMAND, vehcom)) {
        /* If we're waiting for START and receive START,
        then we're in TRANSIENT. */
        last_state = START01;
        return START01;
    } else {
        /* Keep waiting. */
        last_state = PREFIRE;
        return PREFIRE;
    }
} else if (last_state == SHUTDOWN || COMMAND_ISSUED
(SHUTDOWN_COMMAND, vehcom)) {
    /* Once SHUTDOWN is detected, stay in SHUTDOWN
    until re-initialized. */
    last_state = SHUTDOWN;
    return SHUTDOWN;
}
if(last_state==START01) {
    if(++cycles_in_start<25) { 1* 0 to 1.0 sec */
        last_compc = compc;
        last_state = START01;
        return START01;
    } else {
```

```
            last_state = START12;
            return START12;
        }
    };
    if(last_state==START12) {
        if(++cycles_in_start<50) { /* 1.0 to 2.0 sec */
            last_compc = compc;
            last_state = START12;
            return START12;
        } else {
            last_state = START24;
            return START24;
        }
    };
    if(last_state ==START24) {
        if(++cycles_in_start<25*4) { /*2.0 to 4.00 sec minimum */
            last_compc = compc;
            last_state = START24;
            return START24;
        };
    };
    /* ELSE . . . mainstage operation. */
    if((last_state==STEADY_LOW || last_state==STEADY_FULL)
    && fabs(compc-last_compc)<3.35) {
        last_PL = pc;
        last_compc = compc;
        if (compc < 2500.0) {
            last_state = STEADY_LOW;
            return STEADY_LOW;
        } else {
            last_state = STEADY_FULL;
            return STEADY_FULL
        }
    } else { /* In transient */
        if(fabs (compc - pc) <= (5 * 3.35)) {
            /* Transition to steady-state. */
            last_PL = pc;
            last_compc = compc;
            if(compc < 2500.0) {
                last_state = STEADY_LOW;
                return STEADY_LOW;
            } else {
                last_state = STEADY_FULL;
                return STEADY_FULL;
            }
        } else if(last_state==START24) {
            last_PL = pc;
            last_compc = compc;
            return last_state;
        } else if(compc>last_compc || pc<compc) {
            last_PL = pc;
            last_compc = compc;
            last_state = UPTHRUST;
            return UPTHRUST;
        } else {
            last_PL = pc;
            last_compc = compc;
            last_state = DOWNTHRUST;
            return DOWNTHRUST;
        };
    };
};
------------ End Source Code Listing ------------
```

Reduction to practice and performance testing was accomplished using the MSET parameter estimation techniques and rule-based operating mode determination procedure described hereinabove. Substantially identical test results were achieved using the rule-based method and the LVQ neural network method for the operating mode determination procedure 12. This was expected because both methods implemented the same operating mode determination criteria, as defined in FIG. 16, albeit using very different means. Reduction to practice using both neural network and rule-based methods illustrates that the instant invention may employ any one of a plurality of operating mode determination procedures 12 to achieve the benefits described herein.

Alternate Embodiment and in Use and Operation Using a Mathematical Process Model Array for Parameter Estimation and a Rule-Based Logic Sequence for Determining the Operating Mode of the Asset:

In yet another embodiment, an array of mathematical models of the asset is used with the same rule-based logic sequence for operating mode determination described herein above. The mathematical type of process model array 50 is generally specific to a single type of asset and may be implemented in a plurality of forms. In the reduction to practice described herein, the mathematical process model array 50 was prepared for the operating modes of the SSME, as defined in FIG. 16. This embodiment was first reduced to practice in the performance of NASA Contract NAS3-97130. The contract final report, delivered to the United States Government and listed hereinbelow, further describes one embodiment and its reduction to practice, the disclosure of which is incorporated in its entirety herein by reference.

NASA Contract Final Report, "Sensor Validation Tools and SSME Network," NASA Contract NAS3-97130, December 1999. Unrestricted distribution.

Figure 23:
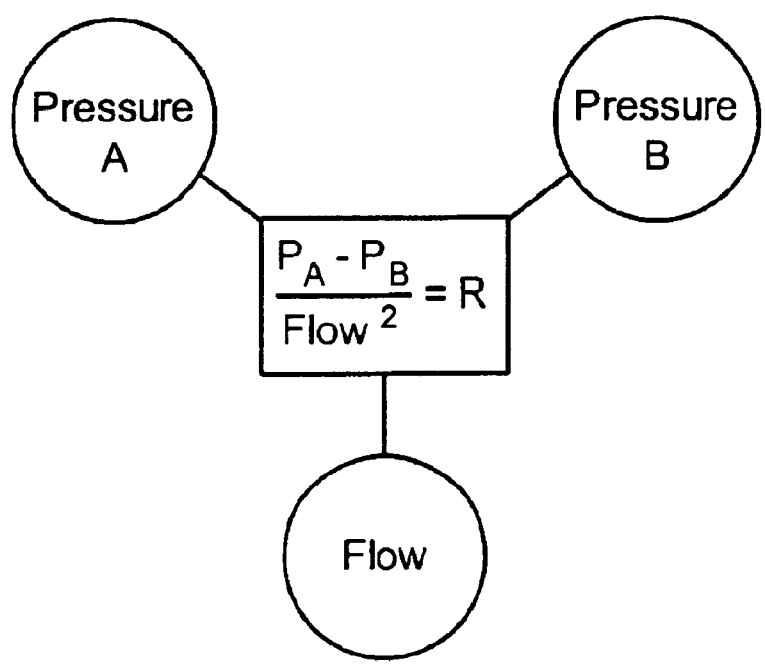
FIG. 23 illustrates a mathematical process model relation of a type used for Space Shuttle Main Engine telemetry data surveillance in an another embodiment.

The mathematical process modeling approach taken in this work was to empirically derive a plurality of mathematical redundancy relations between related groups of SSME signals. For example, FIG. 23 illustrates a mathematical redundancy relation among three related signals using a standard formula for fluid flow line resistance. Additionally, mathematical limit relations were defined in the form of threshold comparison checks for the signal values. Engine system design relationships and sensor redundancies were used to select the mathematical relations used in the mathematical process submodels. A network of these mathematical relations was then assembled to create a separate mathematical process submodel for each SSME operating mode. These operating mode specific mathematical process submodels were then assembled into a process model array 50 comprised of one mathematical process submodel for each operating mode of the SSME.

Reduction to practice and performance testing was accomplished using the mathematical process model array 50 and the rule-based operating mode determination procedure 26 described hereinabove. Substantially similar test results were achieved using the mathematical process model array 50 and the MSET process model array 50 for parameter estimation.

Accordingly, in one aspect the present invention provides the surveillance system and method having process parameter estimation and operating mode partitioning.

In another aspect the present invention provides the system and method as characterized above for performing high sensitivity surveillance of a wide variety of assets including industrial, utility, business, medical, transportation, financial, and biological processes and apparatuses wherein such process and/or apparatus asset preferably has at least two distinct modes of operation.

In another aspect the present invention provides the system and method as characterized above which partitions a parameter estimation model for a process surveillance scheme into two or more coordinated submodels each providing improved parameter estimation for a single operating mode or related subset of operating modes of the process.

In another aspect the present invention provides the system and method as characterized above which creates an improved parameter estimation model for a process surveillance scheme using recorded operating data for an asset to train a parameter estimation model.

In another aspect the present invention provides the system and method as characterized above which provides an improved system and method for surveillance of signal sources and detecting a fault or error state of the signal sources enabling responsive action thereto.

In another aspect the present invention provides the system and method as characterized above which provides an improved system and method for surveillance of on-line, real-time signals, or off-line accumulated signal data.

In another aspect the present invention provides the system and method as characterized above for generating an improved virtual signal estimate for at least one process parameter given an observation of at least one actual signal from the asset.

In another aspect the present invention provides the system and method as characterized above which provides an improved system and method for ultra-sensitive analysis and modification of asset processes and apparatuses using at least one parameter estimation technique for the generation of at least one virtual signal parameter.

In another aspect the present invention provides the system and method as characterized above which provides an improved system and method for ultra-sensitive analysis and modification of asset processes and apparatuses wherein the parameter estimation technique used for the generation of at least one virtual signal parameter is a multivariate state estimation technique (MSET) having any one of a plurality of pattern recognition matrix operators, training procedures, and operating procedures.

In another aspect the present invention provides the system and method as characterized above which provides an improved system and method for ultra-sensitive analysis and modification of asset processes and apparatuses wherein the parameter estimation technique used for the generation of at least one virtual signal parameter is a neural network having any one of a plurality of structures, training procedures, and operating procedures.

In another aspect the present invention provides the system and method as characterized above which provides an improved system and method for ultra-sensitive analysis and modification of asset processes and apparatuses wherein the parameter estimation technique used for the generation of at least one virtual signal parameter is a mathematical process model having any one of a plurality of structures, training procedures, and operating procedures.

In another aspect the present invention provides the system and method as characterized above which provides an improved system and method for ultra-sensitive analysis and modification of asset processes and apparatuses wherein the parameter estimation technique used for the generation of at least one virtual signal parameter is an autoregressive moving average (ARMA) model having any one of a plurality of structures, training procedures, and operating procedures.

In another aspect the present invention provides the system and method as characterized above which provides an improved system and method for ultra-sensitive analysis and modification of asset processes and apparatuses wherein the parameter estimation technique used for the generation of at least one virtual signal parameter is a Kalman filter model having any one of a plurality of structures, training procedures, and operating procedures.

In another aspect the present invention provides the system and method as characterized above which provides a novel system and method for using at least one of a plurality of methods to classify the operating mode of an asset for performing high sensitivity surveillance.

In another aspect the present invention provides the system and method as characterized above which provides a novel system and method to classify the operating mode of an asset wherein said classification is performed using a mathematical or logic sequence having any one of a plurality of structures, training procedures, and operating procedures.

In another aspect the present invention provides the system and method as characterized above which provides a novel system and method to classify the operating mode of an asset wherein said classification is performed using an expert system having any one of a plurality of structures, training procedures, and operating procedures.

In another aspect the present invention provides the system and method as characterized above which provides a novel system and method to classify the operating mode of an asset wherein said classification is performed using a neural network having any one of a plurality of structures, training procedures, and operating procedures.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method for determining asset status, the steps including:
   creating a process model comprised of a plurality of process submodels each correlative to at least one training data subset partitioned from an unpartitioned training data set and each having an operating mode associated thereto;
   acquiring a set of observed signal data values from an asset;
   determining an operating mode of the asset for the set of observed signal data values;
   selecting a process submodel from the process model as a function of the determined operating mode of the asset;
   calculating a set of estimated signal data values from the selected process submodel for the determined operating mode, and
   determining asset status as a function of the calculated set of estimated signal data values.

2. The method of claim 1 wherein the step of creating the process model comprised of the plurality of process submodels includes a step of associating at least one operating mode to each of the plurality of process submodels.

3. The method of claim 2 wherein the selecting step includes a step of selecting the process submodel from the process model such that at least one operating mode associated with the selected process submodel substantially matches the determined operating mode.

4. The method of claim 1 wherein the step of determining asset status includes the step of detecting the presence of a fault.

5. The method of claim 4 wherein the detecting step includes a step of selecting a fault detection method as a function of the determined operating mode for use in detecting the presence of the fault.

6. The method of claim 5 further including the step of making decisions on detected faults.

7. The method of claim 6 wherein the step of making decisions on detected faults includes a step of selecting a fault decision method from a plurality of fault decision methods as a function of the determined operating mode.

8. The method of claim 1 further including the step of performing asset control correlative to determined asset status.

9. The method of claim 1 wherein the step of determining asset status includes the step of determining unacceptable asset status.

10. The method of claim 9 further including the step of enabling responsive action to any determined unacceptable asset status.

11. The method of claim 10 wherein the step of enabling responsive action includes the step of performing control to correct any determined unacceptable asset status.

12. The method of claim 10 wherein the step of enabling responsive action includes the step of alarming off of any determined unacceptable asset status.

13. The method of claim 9 wherein the step of determining unacceptable asset status includes the step of determining sensor signal degradation.

14. The method of claim 9 wherein the step of determining unacceptable asset status includes the step of determining data degradation.

15. The method of claim 9 wherein the step of determining unacceptable asset status includes the step of determining component performance degradation.

16. The method of claim 9 wherein the step of determining unacceptable asset status includes the step of determining process operating anomalies.

17. The method of claim 9 wherein the step of determining unacceptable asset status includes determining at least one fault condition.

18. The method of claim 17 further including the step of ascertaining at least one fault of an asset given at least the one determined fault condition.

19. The method of claim 18 further including the step of enabling responsive action to the asset having at least the one ascertained fault.

20. The method of claim 19 wherein the step of enabling responsive action includes the step of performing control to correct at least the one ascertained fault.

21. The method of claim 19 wherein the step of enabling responsive action includes the step of alarming off of at least the one ascertained fault.

22. A system for determining asset status, said system comprising in combination:
a training data set partitionable into a plurality of training data subsets having a plurality of predefined operating modes associated therewith such that each partitioned training data subset includes at least one of said predefined operating modes associated thereto;
means for acquiring a set of observed signal data values from an asset;
means for determining an operating mode of the asset for the set of observed signal data values;
means for selecting a process submodel from a process model as a function of said determined operating mode of the asset;
means for calculating a set of estimated signal data values from said selected process submodel for said determined operating mode for performing asset surveillance, and
means for determining asset status as a function of the calculated set of estimated signal data values.

23. The system of claim 22 further including means for determining unacceptable asset status as a function of the calculated set of estimated signal data values.

24. The system of claim 23 further including means for performing control to correct any determined unacceptable asset status.

25. The system of claim 23 further including means for alarming off of any determined unacceptable asset status.

26. An asset surveillance method, the steps including:
acquiring a set of signals from an asset correlative to asset status;
digitizing the set of signals for defining a set of digitized signals;
creating a process model comprised of a plurality of process submodels each correlative to at least one training data subset partitioned from an unpartitioned training data set and each having an operating mode associated thereto;
determining an operating mode of the asset;
selecting at least one of the process submodels as a function of the determined operating mode;
producing a set of estimated signal values from the selected process submodel;
detecting a presence of a fault as a function of the set of estimated signal values from the selected process submodel for providing asset surveillance.

27. The method of claim 26 wherein the step of producing the set of estimated signal values from the selected process submodel includes the step of selecting a parameter estimation method as a function of the determined operating mode.

28. The method of claim 27 wherein the step of selecting the parameter estimation method includes a step of selecting the parameter estimation method from a plurality of pattern recognition methods as a function of the determined operating mode.

29. The method of claim 27 wherein the step of selecting the parameter estimation method includes a step of selecting the parameter estimation method from a group of pattern recognition methods comprised of a System State Analyzer (SSA) method, a Bounded Angle Ratio Test (BART) method, a Vector Pattern Recognizer (VPR) method, a Vector Similarity Evaluation Technique (VSET) method, and a Probabilistic State Estimation Method (PSEM) and wherein each method is individually selected from the group of pattern methods as a function of the determined operating mode.

30. The method of claim 26 wherein the fault detecting step includes a step of selecting a fault detection method as a function of the determined operating mode for detecting the presence of the fault.

31. The method of claim 30 wherein the step of selecting the fault detection method includes a step of selecting the fault detection method from a plurality of pattern fault detection methods as a function of the determined operating mode.

32. The method of claim 31 wherein the step of selecting the fault detection method from the plurality of fault detection methods includes a step of selecting the fault detection method from a group of fault detection methods comprised of a Sequential Probability Ratio Test (SPRT) method and a Bayesian Sequential Probability (BSP) method and wherein each method is individually selected, as a function of the determined operating mode, from the group of fault detection methods.

33. The method of claim 26 further including a step of making decisions on detected faults.

34. The method of claim 33 wherein the step of making decisions includes a step of selecting, as a function of the determined operating mode, a fault decision method from a plurality of fault decision methods.

35. The method of claim 34 wherein the step of selecting, as a function of the determined operating mode, the fault decision method from the plurality of fault decision methods includes a step of selecting, as a function of the determined operating mode, associated threshold constants for the plurality of fault decision methods.

36. The method of claim 26 wherein the step of selecting at least one of the process submodels includes the step of individually selecting, as a function of the determined operating mode, each of the process submodels from a plurality of models.

37. The method of claim 36 wherein the step of individually selecting each of the plurality of process submodels includes the step of individually selecting, as a function of the determined operating mode, each of the process submodels from a group of models comprised of a multivariate state estimation technique model, a neural network model, a mathematical model, an autoregressive moving average model, and a Kalman filter model.

38. The method of claim 26 wherein the step of determining the operating mode of the asset includes a step of using at least one method from a group of methods comprised of a logic sequence method, a mathematical model method, a neural network method, and an expert system method for determining the operating mode of the asset.

39. An asset surveillance system, said system comprising in combination:
a data acquisition means for acquiring a set of signals from an asset correlative to asset status;
a digitizing means for digitizing said set of signals for defining a set of digitized signals;
a process model comprised of a plurality of process submodels each correlative to at least one training data subset partitioned from an unpartitioned training data set and wherein each of said partitioned training data subsets and each of said plurality of process submodels has at least one defined operating mode associated therewith;
an operating mode determination means for determining an operating mode of said asset;
a process model selection means for selecting at least one of said process submodels as a function of said determined operating mode;
a parameter estimation means for producing a set of estimated signal values from said selected process submodel;
a fault detection means for detecting the presence of a fault as a function of said set of estimated signal values from said selected process submodel for providing asset surveillance.

40. The system of claim 39 wherein said parameter estimation means includes means for selecting a parameter estimation method as a function of said determined operating mode for producing said set of estimated signal values from said selected process submodel.

41. The system of claim 40 wherein said means for selecting the parameter estimation method includes means for selecting the parameter estimation method from a plurality of pattern recognition methods as a function of said determined operating mode for producing said set of estimated signal values from said selected process submodel.

42. The system of claim 40 wherein said means for selecting the parameter estimation method includes means for selecting the parameter estimation method from a plurality of pattern recognitions methods comprised of any combination of methods from a group of pattern recognition methods comprised of a System State Analyzer (SSA) method, a Bounded Angle Ratio Test (BART) method, a Vector Pattern Recognizer (VPR) method, a Vector Similarity Evaluation Technique (VSET) method, and a Probabilistic State Estimation Method (PSEM) and wherein each method is individually selected from said group of pattern methods as a function of said determined operating mode.

43. The system of claim 39 wherein said fault detection means includes means for selecting a fault detection method as a function of said determined operating mode.

44. The system of claim 43 wherein said means for selecting the fault detection method includes means for selecting the fault detection method from a plurality of pattern fault detection methods.

45. The system of claim 43 wherein said means for selecting the fault detection method includes means for selecting the fault detection method from a group of fault detection methods comprised of a Sequential Probability Ratio Test (SPRT) method and a Bayesian Sequential Probability (BSP) method and wherein each method is individually selected from said group of fault detection methods as a function of said determined operating mode.

46. The system of claim 39 wherein said fault detection means includes means for selecting threshold constants as a function of said determined operating mode.

47. The system of claim 46 wherein said means for selecting threshold constants includes means for selecting a threshold constant from a group comprised of a fault detection procedure false alarm probability, missed alarm probability, and system disturbance magnitude values.

48. The system of claim 39 further including a fault decision means for making decisions on detected faults.

49. The system of claim 48 wherein said fault decision means includes means for selecting a fault decision method from a plurality of fault decision methods as a function of said determined operating mode.

50. The system of claim 49 wherein said fault decision means further includes means for selecting, as a function of said determined operating mode, associated threshold constants for said plurality of fault decision methods.

51. The system of claim 39 wherein each of said plurality of process submodels are of a type individually selected, as a function of said determined operating mode, from a plurality of models.

52. The system of claim 51 wherein each of said plurality of process submodels are of a type individually selected, as a function of said determined operating mode, from a plurality of models comprised of any combination of models from a group of models comprised of a multivariate state estimation technique model, a neural network model, a mathematical model, an autoregressive moving average model, and a Kalman filter model.

53. The system of claim 39 wherein said operating mode determination means is selected from at least one group of methods comprised of a logic sequence method, a mathematical model method, a neural network method, and a expert system method.

54. The system of claim 39 wherein at least one of said plurality of process submodels contains a different number of modeled signal parameters than another one of said plurality of process submodels.

55. The system of claim 39 wherein at least one of said plurality of process submodels contains a different number of process memory matrix vectors than another one of said plurality of process submodels.

56. The system of claim 39 wherein dimensions of at least one of said plurality of process submodels is different than dimensions of another one of said plurality of process submodels.

57. The system of claim 39 wherein at least one of said plurality of process submodels contains different parameter estimation settings than another one of said plurality of process submodels.

58. The system of claim 39 wherein at least one of said plurality of process submodels contains different fault detector settings than another one of said plurality of process submodels.

59. A method for performing surveillance of an asset, the steps including:
creating a process model comprised of a plurality of process submodels each correlative to at least one training data subset partitioned from an unpartitioned training data set and each having an operating mode associated thereto;
acquiring a set of observed signal data values from the asset;
determining an operating mode of the asset for the set of observed signal data values;
selecting a process submodel from the process model as a function of the determined operating mode of the asset;
calculating a set of estimated signal data values from the selected process submodel for the determined operating mode, and
determining asset status by performing the step of comparing the set of observed signal data values to the calculated set of estimated signal data values for performing asset surveillance.

60. The method of claim 59 wherein the step of comparing the set of observed signal data values to the calculated set of estimated signal data values includes the step of comparing the set of observed signal data values to the calculated set of estimated signal data values by using a mathematical function of at least one individual value of the set of observed signal data values and at least one corresponding individual value of the calculated set of estimated signal data values for performing asset surveillance.

61. The method of claim 59 wherein the step of determining asset status further includes the step of using a fault detection means of a type individually selected from the group comprised of a threshold limit test, a statistical hypothesis test, a sequential probability ratio test, and a conditional probability test to evaluate the comparison between at least one individual value of the set of observed signal data values and at least one corresponding individual value of the calculated set of estimated signal data values for performing asset surveillance.

62. The method of claim 59 wherein the step of creating the process model comprised of the plurality of process submodels includes a step of associating at least one operating mode to each of the plurality of process submodels.

63. The method of claim 62 wherein the selecting step includes a step of selecting the process submodel from the process model such that at least one operating mode associated with the selected process submodel substantially matches the determined operating mode.

64. The method of claim 59 wherein the step of determining asset status includes the step of detecting the presence of a fault.

65. The method of claim 64 wherein the detecting step includes a step of selecting a fault detection method as a function of the determined operating mode.

66. The method of claim 65 further including the step of making decisions on detected faults.

67. The method of claim 66 wherein the step of making decisions on detected faults includes a step of selecting a fault decision method from a plurality of fault decision methods as a function of the determined operating mode.

68. A method for performing signal source surveillance, the steps including:
creating a process model comprised of a plurality of process submodels each correlative to at least one training data subset partitioned from an unpartitioned training data set and each having an operating mode associated thereto;
acquiring a set of observed signal data values from at least one signal source;
determining an operating mode of at least the one signal source for the set of observed signal data values;
selecting a process submodel from the process model as a function of the determined operating mode of at least the one signal source;
calculating a set of estimated signal data values from the selected process submodel for the determined operating mode, and
determining status of at least the one signal source as a function of the calculated set of estimated signal data values for performing signal source surveillance.

69. The method of claim 68 further including the step of performing control of at least the one signal source correlative to determined status.

70. The method of claim 68 wherein the step of determining status includes the step of determining unacceptable status of at least the one signal source.

71. The method of claim 70 further including the step of enabling responsive action to determined unacceptable status of at least the one signal source.

72. The method of claim 71 wherein the step of enabling responsive action includes the step of performing control of at least the one signal source for which unacceptable status was determined.

73. The method of claim 71 wherein the step of enabling responsive action includes the step of alarming off of determined unacceptable status of at least the one signal source.

74. The method of claim 71 wherein the step of determining unacceptable status of at least the one signal source includes the step of determining at least one fault of at least the one signal source.

75. The method of claim 74 further including the step of determining status of at least one asset associated with at least the one signal source as a function of at least the one determined fault.

76. The method of claim 75 further including a step of performing control of at least the one asset for at least the one determined fault.

77. The method of claim 75 wherein the step of enabling responsive action includes the step of alarming off of at least the one determined fault.

78. The method of claim 68 wherein the step of creating the process model comprised of the plurality of process submodels includes a step of associating at least one operating mode to each of the plurality of process submodels.

79. The method of claim 78 wherein the selecting step includes a step of selecting the process submodel from the process model such that at least one operating mode associated with the selected process submodel substantially matches the determined operating mode.

80. The method of claim 68 wherein the step of determining asset status includes the step of detecting the presence of a fault.

81. The method of claim 80 wherein the detecting step includes a step of selecting a fault detection method as a function of the determined operating mode.

82. The method of claim 80 further including the step of making decisions on detected faults.

83. The method of claim 82 wherein the step of making decisions on detected faults includes a step of selecting a fault decision method from a plurality of fault decision methods as a function of the determined operating mode.

84. A method for performing asset control, the steps including:
creating a process model comprised of a plurality of process submodels each correlative to at least one training data subset partitioned from an unpartitioned training data set and each having an operating mode associated thereto;
acquiring a set of observed signal data values from the asset;
determining an operating mode of the asset for the set of observed signal data values;
selecting a process submodel from the process model as a function of the determined operating mode of the asset;
calculating a set of estimated signal data values from the selected process submodel for the determined operating mode, and
employing at least one of the calculated set of estimated signal data values as at least one virtual signal value for performing asset control.

85. The method of claim 84 further including the step of using at least the one virtual signal value in place of at least one of the observed signal data values for determining asset status.

86. The method of claim 85 further including a step of using at least the one virtual signal value in place of at least one of the observed signal data values for determining unacceptable asset status.

87. The method of claim 86 further including a step of performing control to correct any determined unacceptable asset status.

88. The method of claim 86 further including a step of alarming off of any determined unacceptable asset status.

* * * * *